US010198287B2

(12) United States Patent
Sekimoto et al.

(10) Patent No.: US 10,198,287 B2
(45) Date of Patent: Feb. 5, 2019

(54) SYSTEM AND METHOD FOR IMPROVING MOTOR VEHICLE SAFETY

(71) Applicant: CLARION CO., LTD., Saitama-shi, Saitama (JP)

(72) Inventors: Nobuhiro Sekimoto, Tokyo (JP); Naoki Mori, Tokyo (JP); Shintaro Takada, Tokyo (JP)

(73) Assignee: CLARION CO., LTD., Saitama (JP)

( * ) Notice: Subject to any disclaimer, the term of this patent is extended or adjusted under 35 U.S.C. 154(b) by 41 days.

(21) Appl. No.: 15/323,606

(22) PCT Filed: Jun. 19, 2015

(86) PCT No.: PCT/JP2015/067732
§ 371 (c)(1),
(2) Date: Jan. 3, 2017

(87) PCT Pub. No.: WO2016/013335
PCT Pub. Date: Jan. 28, 2016

(65) Prior Publication Data
US 2017/0147396 A1 May 25, 2017

(30) Foreign Application Priority Data

Jul. 23, 2014 (JP) .................................. 2014-149722

(51) Int. Cl.
*G06F 9/46* (2006.01)
*G06F 9/48* (2006.01)
(Continued)

(52) U.S. Cl.
CPC ............ *G06F 9/485* (2013.01); *G06F 9/4881* (2013.01); *G06F 17/30* (2013.01); *G06Q 30/02* (2013.01); *G08G 1/0962* (2013.01)

(58) Field of Classification Search
None
See application file for complete search history.

(56) References Cited

U.S. PATENT DOCUMENTS

2002/0120374 A1    8/2002  Douros et al.
2007/0239635 A1*  10/2007  Yoshiike .................. G06N 3/02
                                                              706/15
(Continued)

FOREIGN PATENT DOCUMENTS

JP    2003-125454 A    4/2003
JP    2004-080066 A    3/2004
(Continued)

OTHER PUBLICATIONS

Extended European Search Report dated Jan. 29, 2018 for the European Application No. 15824572.0.
(Continued)

*Primary Examiner* — Gregory A Kessler
(74) *Attorney, Agent, or Firm* — Volpe and Koenig, P.C.

(57) ABSTRACT

An information presentation device includes: a situation estimation unit configured to identify one or more tasks based on input information that has been input and task information indicating one or more tasks indicating a situation; a load estimation unit configured to identify one or more sub-tasks based on each of the identified tasks and sub-task information indicating, for each situation of a task, one or more sub-tasks, which are work elements, having a possibility of being executed by a worker, and to acquire a load demand amount based on the identified sub-tasks and sub-task demand amount information indicating a load demand amount, which is a mental load for each sub-task; a capacity level estimation unit configured to acquire a capacity level based on the acquired load demand amount; and a presentation information selection unit configured to select information to be presented based on the capacity level.

7 Claims, 29 Drawing Sheets

(51) Int. Cl.
*G06F 17/30* (2006.01)
*G06Q 30/02* (2012.01)
*G08G 1/0962* (2006.01)

(56) References Cited

U.S. PATENT DOCUMENTS

| | | | | |
|---|---|---|---|---|
| 2011/0238428 | A1* | 9/2011 | Kawamoto | G06Q 40/02 |
| | | | | 705/1.1 |
| 2015/0026342 | A1* | 1/2015 | Chen | G06F 9/5055 |
| | | | | 709/226 |

FOREIGN PATENT DOCUMENTS

| | | | |
|---|---|---|---|
| JP | 2004-272048 | A | 9/2004 |
| JP | 2007-113964 | A | 5/2007 |
| JP | 2009-237104 | A | 10/2009 |
| JP | 4637073 | B2 | 2/2011 |
| JP | 2012-183224 | A | 9/2012 |
| JP | 2012-216203 | A | 11/2012 |
| JP | 2013-032986 | A | 2/2013 |

OTHER PUBLICATIONS

Japanese Office Action dated Oct. 23, 2018 for the Japanese Patent Application No. 2014-149722.

* cited by examiner

FIG.2A

| TASK ID (201) | CATE-GORY (202) | TASK NAME (203) | INPUT CONDITION (211a/204a/212a) | | INPUT CONDITION (211b/204b/212b) | | ... | INPUT CONDITION X (211c/204c/212c) | |
|---|---|---|---|---|---|---|---|---|---|
| | | | INPUT ITEM | CONDITION | INPUT ITEM | CONDI-TION | | INPUT ITEM | CONDI-TION |
| 0 | DEFAULT | DEFAULT | ESTAB-LISHED TASK | NONE | | | | | |
| 1 | TRAVEL TASK | STOPPING | SPEED | = 0 | | | | | |
| 2 | | STARTING | SPEED | 1~5 | BRAKE | OFF | | | |
| 3 | | ACCELERATING | SPEED | >5 | ACCEL-ERATOR | >10 | | | |
| 4 | | DECELERATING | SPEED | >5 | BRAKE | ON | | | |
| 5 | | PROCEEDING SLOWLY | SPEED | <=30 | | | | | |
| 6 | | TRAVELING STEADILY | SPEED | 30~50 | | | | | |
| ... | ... | ... | ... | ... | ... | ... | ... | ... | ... |
| 101 | LOCATION TASK | PROCEEDING STRAIGHT AHEAD AT CROSS-ROAD INTERSECTION HAVING TRAFFIC LIGHTS | POINT SHAPE | CROSS-ROAD INTERSECTION HAVING TRAFFIC LIGHTS | DIREC-TION OF TRAVEL | STRAIGHT AHEAD | | | |
| 102 | | TURNING LEFT AT CROSS-ROAD INTERSECTION HAVING TRAFFIC LIGHTS | POINT SHAPE | CROSS-ROAD INTERSECTION HAVING TRAFFIC LIGHTS | DIREC-TION OF TRAVEL | LEFT OR SHARP REFT TURN | | | |
| 103 | | TURNING RIGHT AT CROSS-ROAD INTERSECTION HAVING TRAFFIC LIGHTS | POINT SHAPE | CROSS-ROAD INTERSECTION HAVING TRAFFIC LIGHTS | DIREC-TION OF TRAVEL | RIGHT OR SHARP RIGHT TURN | | | |
| ... | ... | ... | ... | ... | ... | ... | ... | ... | ... |

| TASK ID | CATEGORY | TASK NAME | INPUT CONDITION a | | INPUT CONDITION b | | ... | INPUT CONDITION X | |
|---|---|---|---|---|---|---|---|---|---|
| | | | INPUT ITEM | CONDITION | INPUT ITEM | CONDITION | | INPUT ITEM | CONDITION |
| ... | ... | ... | ... | ... | ... | ... | ... | ... | ... |
| 201 | SURROUNDINGS TASK | PRECEDING VEHICLE DETECTION | PRECEDING VEHICLE DETECTION | ON | | | | | |
| 202 | | APPROACH PRECEDING VEHICLE (MEDIUM) | DISTANCE TO PRECEDING VEHICLE | 0.6~1.5 | | | | | |
| 203 | | APPROACH PRECEDING VEHICLE (CLOSE) | DISTANCE TO PRECEDING VEHICLE | <0.6 | | | | | |
| 204 | | PERSON DETECTION | PERSON DETECTION | ON | | | | | |
| 205 | | PERSON COLLISION WARNING | PERSON WARNING | ON | | | | | |
| ... | ... | ... | ... | ... | ... | ... | ... | ... | ... |
| 303 | PHYSICAL TASK | SUN GLARE | SUNLIGHT | STRONG | BEARING | DIRECTION OF SUN | | | |
| 304 | | NIGHT TIME/DIM LOCATION | HEADLIGHTS | ON | | | | | |
| 305 | | RAIN/SNOW | WINDSCREEN WIPERS | ON | | | | | |
| ... | ... | ... | ... | ... | ... | ... | ... | ... | ... |
| 901 | DYNAMIC FACTOR | SPEED/INTER-VEHICLE DISTANCE f(v,x) | SPEED | >10 | DISTANCE TO PRECEDING VEHICLE | >0.1 | | | |
| ... | ... | ... | ... | ... | ... | ... | ... | ... | ... |

FIG.3A

| TASK ID | CATEGORY | TASK NAME | SUB-TASK1 | SUB-TASK2 | SUB-TASK3 | SUB-TASK4 | ... | SUB-TASK n |
|---|---|---|---|---|---|---|---|---|
| 0 | DEFAULT | DEFAULT | P_CHK_F | V_CHK_F | CTL_ACL | | | |
| 1 | TRAVEL | STOPPING | CTL_BRAKE | | | | | |
| 2 | | STARTING | P_CHK_F | V_CHK_F | DCD_STT | CTL_ACL | | |
| 3 | | ACCELERATING | DCD_ACL | CTL_ACC | | | | |
| 4 | | DECELERATING | DCD_BRK | CTL_BRK | | | | |
| 5 | | PROCEEDING SLOWLY | P_SCN_F | V_SCN_F | | | | |
| 6 | | TRAVELING STEADILY | P_CHK_F | V_CHK_F | | | | |
| ... | ... | ... | ... | ... | ... | ... | ... | ... |
| 101 | LOCATION | PROCEEDING STRAIGHT AHEAD AT CROSS-ROAD INTERSECTION HAVING TRAFFIC LIGHTS | C_CHK_SIG | C_CHK_SPC | | | | |
| 102 | | TURNING LEFT AT CROSS-ROAD INTERSECTION HAVING TRAFFIC LIGHTS | C_CHK_SIG | C_CHK_SPC | DCD_DIR | CTL_WKR | ... | P_SCN_L |
| 103 | | TURNING RIGHT AT CROSS-ROAD INTERSECTION HAVING TRAFFIC LIGHTS | C_CHK_SIG | C_CHK_SPC | DCD_DIR | CTL_WKR | ... | P_SCN_R |
| ... | ... | ... | ... | ... | ... | ... | ... | ... |

FIG.3B

| TASK ID | CATEGORY | TASK NAME | SUB-TASK1 | SUB-TASK2 | SUB-TASK3 | SUB-TASK4 | ... | SUB-TASKn |
|---|---|---|---|---|---|---|---|---|
| ... | ... | ... | ... | ... | ... | ... | ... | ... |
| 201 | SURROUNDINGS | PRECEDING VEHICLE DETECTION | V_CHK_F | | | | | |
| 202 | | APPROACH PRECEDING VEHICLE (MEDIUM) | V_SCN_F | | | | | |
| 203 | | APPROACH PRECEDING VEHICLE (CLOSE) | V_SCN_F | DCD_BRK | CTL_BRK | DCD_HDL | ... | CTL_HDL |
| 204 | | PERSON DETECTION | P_CHK_F | | | | | |
| 205 | | PERSON COLLISION WARNING | P_SCN_F | DCD_BRK | CTL_BRK | DCD_HDL | ... | CTL_HDL |
| ... | ... | ... | ... | ... | ... | ... | ... | ... |
| 303 | PHYSICAL | SUN GLARE | V_SCN_F | P_SCN_F | | | | |
| 304 | | NIGHT TIME/DIM LOCATION | V_SCN_F | P_SCN_F | C_CHK_RD | | | |
| 305 | | RAIN/SNOW | V_SCN_F | P_SCN_F | C_CHK_RD | | | |
| ... | ... | ... | ... | ... | ... | ... | ... | ... |

| 401 | 402 | 403 | 404a | 404b | 404c 404 | 404d | ... 404e | 405 |
|---|---|---|---|---|---|---|---|---|
| SUB-TASK ID | CATEGORY | SUB-TASK NAME | LOAD DEMAND AMOUNT | | | | | CO-EFFI-CIENT |
| | | | VISUAL DEMAND | AUDITORY DEMAND | RECOGNITION/ DECISION DEMAND | MENTAL OPERATION DEMAND | ... DEMAND Y | |
| 1 | ACTION/ DECISION | DCD_BRK | 0.0 | 0.0 | 6.8 | 0.0 | ... 0.0 | 1.0 |
| 2 | | DCD_ACC | 0.0 | 0.0 | 4.6 | 0.0 | ... 0.0 | 1.0 |
| 3 | | DCD_DIR | 4.0 | 1.0 | 6.8 | 0.0 | ... 0.0 | 1.0 |
| 4 | | DCD_HDL | 0.0 | 0.0 | 4.6 | 0.0 | ... 0.0 | 1.0 |
| ... | ... | ... | ... | ... | ... | ... | ... ... | ... |
| 64 | VEHICLE | V_CHK_F | 3.7 | 1.0 | 1.0 | 0.0 | ... 0.0 | 1.0 |
| 65 | | V_CHK_L | 3.7 | 1.0 | 1.0 | 0.0 | ... 0.0 | 1.0 |
| 66 | | V_CHK_R | 3.7 | 1.0 | 1.0 | 0.0 | ... 0.0 | 1.0 |
| 67 | | V_CHK_B | 3.7 | 1.0 | 1.0 | 0.0 | ... 0.0 | 1.0 |
| 68 | | V_SCN_F | 5.4 | 1.0 | 3.7 | 0.0 | ... 0.0 | 1.0 |
| 69 | | V_SCN_L | 5.4 | 1.0 | 3.7 | 0.0 | ... 0.0 | 1.0 |
| 70 | | V_SCN_R | 5.4 | 1.0 | 3.7 | 0.0 | ... 0.0 | 1.0 |
| ... | ... | ... | ... | ... | ... | ... | ... ... | ... |

| SUB-TASK ID (401) | CATEGORY (402) | SUB-TASK NAME (403) | LOAD DEMAND AMOUNT (404) | | | | | | CO-EFFI-CIENT (405) |
|---|---|---|---|---|---|---|---|---|---|
| | | | VISUAL DEMAND (404a) | AUDITORY DEMAND (404b) | RECOGNITION/DECISION DEMAND (404c) | MENTAL OPERATION DEMAND (404d) | ... | DEMAND Y (404e) | |
| ... | ... | ... | ... | ... | ... | ... | ... | ... | ... |
| 128 | PEDESTRIAN | P_CHK_F | 3.7 | 0.0 | 1.0 | 0.0 | ... | 0.0 | 1.0 |
| 129 | | P_CHK_L | 3.7 | 0.0 | 1.0 | 0.0 | ... | 0.0 | 1.0 |
| 130 | | P_CHK_R | 3.7 | 0.0 | 1.0 | 0.0 | ... | 0.0 | 1.0 |
| 131 | | P_CHK_B | 3.7 | 0.0 | 1.0 | 0.0 | ... | 0.0 | 1.0 |
| 132 | | P_SCN_F | 5.4 | 0.0 | 3.7 | 0.0 | ... | 0.0 | 1.0 |
| 133 | | P_SCN_L | 5.4 | 0.0 | 3.7 | 0.0 | ... | 0.0 | 1.0 |
| 134 | | P_SCN_R | 5.4 | 0.0 | 3.7 | 0.0 | ... | 0.0 | 1.0 |
| ... | ... | ... | ... | ... | ... | ... | ... | ... | ... |
| 192 | OPERATION | CTL_BRK | 3.7 | 1.0 | 3.7 | 0.0 | ... | 0.0 | 1.0 |
| 193 | | CTL_ACC | 0.0 | 1.0 | 1.0 | 5.8 | ... | 0.0 | 1.0 |
| 194 | | CTL_WKR | 3.7 | 4.3 | 1.2 | 2.2 | ... | 0.0 | 1.0 |
| 195 | | CTL_HDL | 0.0 | 1.0 | 1.0 | 5.8 | ... | 0.0 | 1.0 |
| ... | ... | ... | ... | ... | ... | ... | ... | ... | ... |
| 256 | ROAD/BUILDING/OBSTACLE | C_CHK_SIG | 3.7 | 1.0 | 3.7 | 0.0 | ... | 0.0 | 1.0 |
| 257 | | C_CHK_SPC | 4.0 | 0.0 | 1.0 | 0.0 | ... | 0.0 | 1.0 |
| 258 | | C_CHK_LN | 4.0 | 0.0 | 1.0 | 0.0 | ... | 0.0 | 1.0 |
| ... | ... | ... | ... | ... | ... | ... | ... | ... | ... |

164

| DEMAND ID | DEMAND NAME | WEIGHTING COEFFICIENT |
|---|---|---|
| 0 | CONSTANT TERM | 22.1 |
| 1 | VISUAL DEMAND | 0.6 |
| 2 | AUDITORY DEMAND | 0.2 |
| 3 | RECOGNITION/DECISION DEMAND | 0.4 |
| 4 | OPERATION DEMAND | 0.3 |
| ⋮ | ⋮ | ⋮ |
| Y | DEMAND Y | 0.1 |

| | 601 | 602 | 603 | 604 | 605 |
|---|---|---|---|---|---|
| | ITEM NUBNER | INFORMATION SOURCE NAME | INFORMATION TYPE | PRESENTATION DEMAND AMOUNT | PRESENTATION TIME |
| | 1 | INFORMATION SOURCE 1 (VEHICLE WARNING) | FUEL LEVEL WARNING | 0 | 0 |
| | 2 | | BATTERY WARNING | 0 | 0 |
| | 3 | | BRAKE WARNING | 0 | 0 |
| | 4 | | OIL PRESSURE WARNING | 0 | 0 |
| | 5 | | DOOR OPNING WARNING | 0 | 0 |
| | 6 | | SEATBELT WARNING | 0 | 0 |
| | ⋮ | ⋮ | ⋮ | ⋮ | ⋮ |
| | 21 | INFORMATION SOURCE 2 (ADAS) | PRECEDING CAR COLLISION WARNING | 0 | 0 |
| | 22 | | PRECEDING CAR PROXIMITY WARNING | 30 | 0 |
| | 23 | | PEDESTRIAN COLLISION WARNING | 0 | 0 |
| | 24 | | LANE DEPARTURE WARNING | 30 | 0 |
| | ⋮ | ⋮ | ⋮ | ⋮ | ⋮ |

| ITEM NUBNER | INFORMATION SOURCE NAME | INFORMATION TYPE | PRESENTATION DEMAND AMOUNT | PRESENTATION TIME |
|---|---|---|---|---|
| ⋮ | ⋮ | ⋮ | ⋮ | ⋮ |
| 31 | INFORMATION SOURCE 3 (NAVIGATION SYSTEM) | TURN-BY-TURN | 30 | 5 |
| 32 | | ENLARGED VIEW OF INTERSECTION | 50 | 5 |
| 33 | | NEXT POINT ADVANCED NOTICE | 50 | 5 |
| ⋮ | | ⋮ | ⋮ | ⋮ |
| 41 | INFORMATION SOURCE 4 (VICS) | SIMPLE MAP DISPLAY | 50 | 5 |
| 42 | | CHARACTER DISPLAY | 50 | 5 |
| ⋮ | ⋮ | ⋮ | ⋮ | ⋮ |
| 51 | NFORMATION SOURCE 5 (MUSIC PLAYER) | OPERATION MODE | 70 | 0 |
| 52 | | ALBUM NAME INFORMAITON | 70 | 2 |
| 53 | | TRACK NAME INFORMATION | 70 | 2 |
| 54 | | ARITIST NAME INFORMAITON | 70 | 2 |
| 55 | | PLAYBACK POSITION | 70 | 0 |
| ⋮ | ⋮ | ⋮ | ⋮ | ⋮ |

| ITEM NUMBER | INPUT | DATA NAME | VALUE |
|---|---|---|---|
| 1 | INFORMATION SOURCE 1 (CAN) | VEHICLE SPEED | 42 |
| 2 | | STEERING WHEEL ANGLE | 2 |
| 3 | | ACCELERATOR | 0 |
| 4 | | BRAKE | ON |
| 5 | | TRUN SIGNAL | 1 |
| 6 | | WINDSCREEN WIPERS | 0 |
| ... | ... | ... | ... |
| 21 | INFORMATION SOURCE 2 (NAVIGATION SYSTEM) | ROAD CLASS | GENERAL ROAD |
| 22 | | POINT SHAPE | CROSS-ROAD INTERSECTION HAVING TRAFFIC LIGHTS |
| 23 | | DIRECTION OF TRAVEL | RIGHT |
| 24 | | POINT DISTANCE | 120 |
| 25 | | BEARING | 125 |
| 26 | | LATITUDE | 35.36541 |
| 27 | | LONGITUDE | 135.68745 |
| ... | ... | ... | ... |
| 41 | INFORMATION SOURCE 3 (ADAS) | PRECEDING VEHICLE DETECTION | ON |
| 42 | | PRECEDING VEHCLE DISTANCE | 1.8 |
| 43 | | PRECEDING VEHCLE COLLISION WARNING | OFF |
| 44 | | PERSON DETECTION | ON |
| 45 | | PERSON COLLISION WARNING | OFF |
| 46 | | LANE DEPATURE TO LEFT | OFF |
| ... | ... | ... | ... |

| ITEM NUMBER | ESTABLISHED TASK |
|---|---|
| 1 | DECELERATE |
| 2 | TRAVEL STEADILY |
| 3 | TURN RIGHT AT CROSS-ROAD INTERSECTION HAVING TRAFFIC LIGHTS |
| 4 | INTER-VEHICLE DISTANCE TO PRECEDING VEHICLE (MEDIUM) |

| ITEM NUMBER | ESTABLISHED SUB-TASK NAME | COUNT |
|---|---|---|
| 1 | DCD_BRK | 1 |
| 2 | CTL_BRK | 1 |
| 3 | P_SCN_F | 1 |
| 4 | V_SCN_F | 2 |
| 5 | C_CHK_SIG | 1 |
| 6 | C_CHK_SPC | 1 |
| 7 | DCD_DIR | 1 |
| 8 | CTL_WKR | 1 |
| ... | ... | ... |

| ITEM NUMBER | INPUT DATA | DURATION |
|---|---|---|
| 1 | DATA1 | 30 |
| 2 | DATA2 | 52 |
| 3 | DATA3 | 510 |
| 4 | DATA4 | 65 |
| 5 | DATA5 | 109 |
| 6 | DATA6 | 21 |
| 7 | DATA7 | 52 |
| 8 | DATA8 | 31 |
|  |  |  |

| NORMAL | REQUIRED TIME: 1HOUR 20MINUTES<br>TRAVEL DISTANCE: 67km |
| --- | --- |
| LOW FATIGUE | REQUIRED TIME : 1HOUR 40MINUTES<br>TRAVEL DISTANCE : 76km |
| LOW STRESS | REQUIRED TIME : 1HOUR 52MINUTES<br>TRAVEL DISTANCE : 82km |
| LEISURELY TRAVEL | REQUIRED TIME: 1HOUR 40MINUTES<br>TRAVEL DISTANCE : 76km |

FIG.23

TASK CONDITION TABLE

TASK: ADD | CHANGE | DELETE

| TASK ID | CAT-EGORY | TASK NAME | INPUT CONDITION 1 | |
|---|---|---|---|---|
| | | | INPUT ITEM | CONDITION |
| 0 | DEFAULT | DEFAULT | ESTABLISED TASK | SHIFT POSITION |
| 1 | | STOPPING | SPEED | SPEED |
| 2 | | STARTING | SPPED | ACCELERATOR |
| 3 | TRAVEL TASK | ACCELER-ATING | SPEED | BRAKE |
| | | | | TURN SIGNALS |
| 4 | | DECELER-ATING | SPEED | >5 |

NEW CATEGORY

SYSTEM AND METHOD FOR IMPROVING MOTOR VEHICLE SAFETY

TECHNICAL FIELD

The present invention relates to an information presentation device, a method, and a program. The present invention claims priority from Japanese Patent Application No. 2014-149722, filed on Jul. 23, 2014, the entire contents of which are hereby incorporated by reference for the designated countries allowing incorporation by reference.

BACKGROUND ART

In Patent Literature 1, there is a description of a "navigation device including: travel route data storage means for storing travel route data indicating a planned travel route along which a vehicle driven by a user is to travel; correlation data storage means for storing workload correlation data indicating a correlation between a behavior by the user and a workload of the user during vehicle travel; planned presentation information storage means for storing planned presentation information, which is information planned on being presented to the user when traveling along the travel route; user behavior estimation processing means for performing user behavior estimation processing to estimate, based on the travel route data, a behavior of the user during travel along the travel route; workload prediction processing means for performing workload prediction processing to predict, based on the estimated behavior of the user and the workload correlation data, a workload corresponding to the behavior of the user during travel along the travel route; scheduling processing means for performing scheduling processing to determine, based on the predicted workload, a timing at which the planned presentation information is to be presented to the user when traveling along the travel route; and information output means for outputting the planned presentation information to the user at the determined timing".

CITATION LIST

Patent Literature

[PTL 1] JP 4637073 B2

SUMMARY OF INVENTION

Technical Problem

In the technology described in Patent Literature 1, workload correlation data indicating a correlation between the behavior of the user and the workload of the user is used. In other words, it is necessary to define in advance a situation and a mental workload (hereinafter referred to as "WL") in that situation. However, in actual practice, there is an almost infinite number of situations that can exist. It is difficult to define and measure the WL for all of those situations, and, it is not easy to expand those situations into more detail. Further, there are cases in which the situation changes based on an even larger number of factors, including not only external factors, but internal factors and the like as well. Calculating the WL for such a situation is very difficult.

The present invention has been made in view of such circumstances. It is an object of the present invention to provide an information presentation technology that, even for a very large number of situations, is highly comprehensive and is easily maintained and managed, and that considers a mental load.

Solution to Problem

In order to solve the above-mentioned problems, there is provided, for example, an information presentation device, including: a storage unit configured to store task information indicating one or more tasks indicating a situation, sub-task information indicating, for each situation of a task, one or more sub-tasks, which are work elements, having a possibility of being executed by a worker, and sub-task demand amount information indicating a load demand amount, which is a mental load for each sub-task; an information acquisition unit into which input information is input from one or more external information sources; a situation estimation unit configured to identify one or more tasks based on the input information that has been input and the task information; a load estimation unit configured to identify one or more sub-tasks based on each of the identified one or more tasks and the sub-task information, and to acquire a load demand amount based on the identified one or more sub-tasks and the sub-task demand amount information; a capacity level estimation unit configured to acquire a capacity level based on the acquired load demand amount; and a presentation information selection unit configured to select information to be presented based on the capacity level.

Advantageous Effects of Invention

According to a technology of the present invention, it is possible to provide the information presentation technology that, even for a very large number of situations, is highly comprehensive and is easily maintained and managed, and that considers a mental load. Other problems to be solved, configurations, and advantageous effects of the present invention are now clarified based on the description of the following embodiment.

BRIEF DESCRIPTION OF DRAWINGS

FIGS. 2A and 2B are explanatory diagrams of an example of a task condition table.

FIGS. 3A and 3B are explanatory diagrams of an example of a sub-task table.

FIGS. 4A and 4B are explanatory diagrams of an example of a sub-task demand amount table.

FIGS. 6A and 6B are explanatory diagrams of an example of an information presentation table.

FIG. 9 is an example of input information.

FIG. 11 is an example of an established task group obtained as a result of the situation estimation processing.

FIG. 13 is an example of an established sub-task group generated by the sub-task estimation processing.

FIG. 19 is an example of input information acquired as time series information.

FIG. 21 is an example of a screen for setting a capacity level preference of a driver for the route to be provided as guidance.

FIG. 23 is an example of a screen for creating and updating the task condition table.

DESCRIPTION OF EMBODIMENTS

Figure 1:
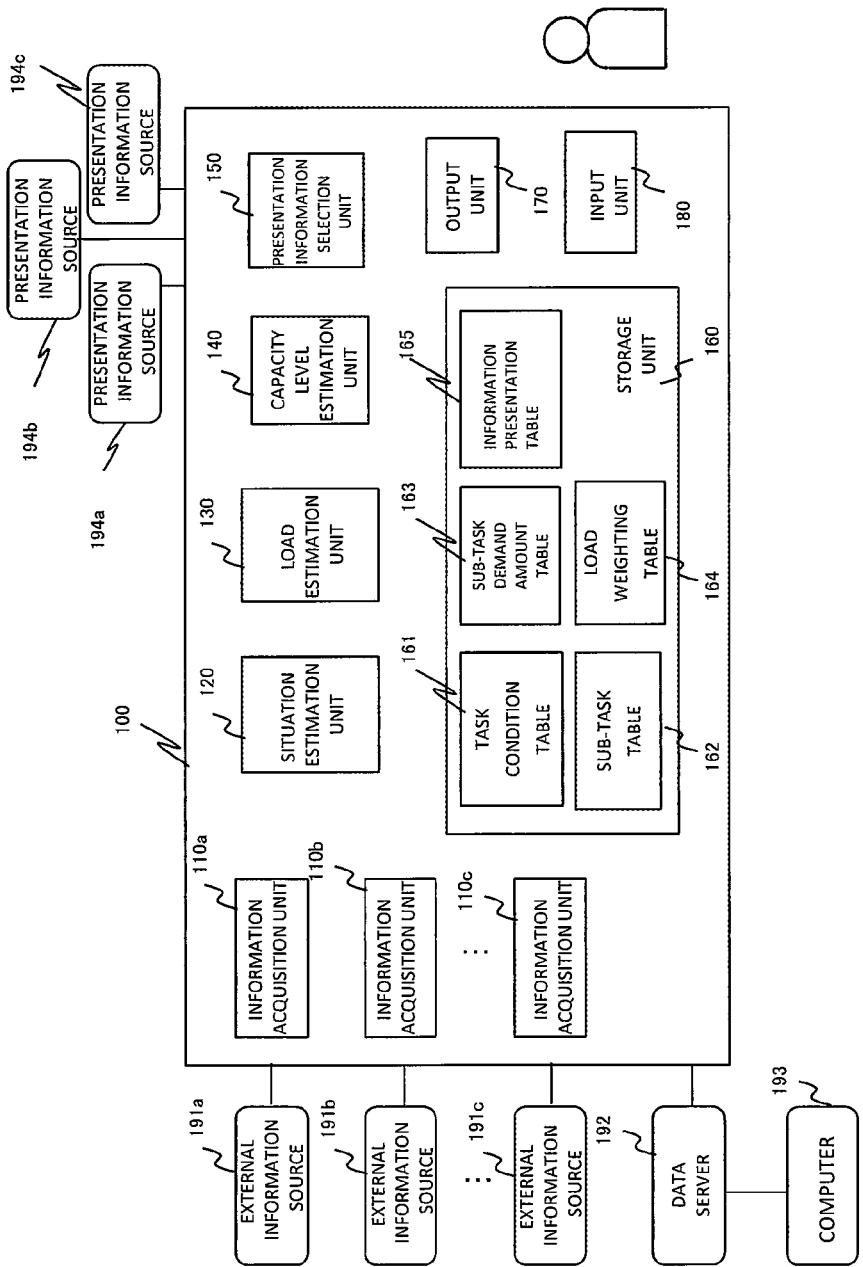
FIG. 1 is an example of a block diagram of an information presentation device according to an embodiment of the present invention.

A detailed description is now given of an embodiment of the present invention referring to the drawings. In the following, the same components are denoted by the same reference symbols, and a description thereof is therefore omitted.

In the following description, an information presentation device is described as a device capable of moving together with a mobile body. The term "mobile body" as used herein refers to a body, such as a vehicle or a person, capable of moving by means of at least one of an external movement function or an internal movement function. Further, a worker is a person to which presentation information presented and controlled by the information presentation device is to be presented, and who performs an operation, a behavior, an action, or the like, that is directly or indirectly related to movement of the mobile body. Specifically, for example, when the mobile body is a vehicle, the worker is the driver of that vehicle, and when the mobile body is a person, the worker is that person. In the following description, operations, behaviors, actions, and the like, directly or indirectly related to movement of the mobile body are collectively referred to as "work".

In the following description, the information presentation device is described as a device that is mounted on a vehicle and is configured to control provision to a worker of, for example, information on route guidance, a vehicle warning, and safety assistance, and infotainment from a music player and the like. However, the information presentation device is not limited to this example.

[Configuration Description]

FIG. 1 is an example of a block diagram of the information presentation device according to this embodiment. An information presentation device 100 includes one or more information acquisition units 110, a situation estimation unit 120, a load estimation unit 130, a capacity level estimation unit 140, a presentation information selection unit 150, a storage unit 160, an output unit 170, an input unit 180, and the like. The storage unit 160 is configured to store a task condition table 161, a sub-task table 162, a sub-task demand amount table 163, a load weighting table 164, an information presentation table 165, and the like.

The task condition table 161 is configured to define one or more tasks indicating a current situation. The sub-task table 162 is configured to define one or more sub-tasks, which are work elements for each task. The sub-task demand amount table 163 is configured to define each load demand amount for each sub-task. The load weighting table 164 is configured to define, for example, a weighting to be applied on the load demand amounts. The information presentation table 165 is configured to define a capacity level condition when presenting information. Each of the tables is described in more detail later.

One or more information acquisition units 110 and one or more external information sources 191 may be employed. However, in this example, the information presentation device 100 is described as including information acquisition units 110a to 110c, in which the information acquisition units 110a to 110c are configured to acquire input information from external information sources 191a to 191c, respectively. However, it is not necessary for the information acquisition units 110 and the external information sources 191 to be in a one-to-one relationship.

The external information sources 191 are not particularly limited, as long as the external information sources 191 are configured to acquire input information, which is information for determining a situation, such as information on the vehicle itself, the vehicle surroundings, and the worker. An example of such an external information source is a controller area network (CAN), which is capable of acquiring vehicle information including a vehicle speed, an acceleration amount, a brake state, a turn signal state, and the like. Another example of the external information source is a car navigation system capable of acquiring a class of the road being traveled along, intersection information, travel position coordinates, and road information on a direction of travel at an intersection and on the roads to be traveled along as a travel plan. Another example of the external information source is an advanced driving assistance system (hereinafter abbreviated to "ADAS") configured to measure the surroundings of a vehicle by using sensors, such as cameras and infrared sensors, and to detect vehicles and pedestrians that are traveling in front of or around the vehicle. The ADAS is also configured to detect the distance to or time until a collision with a detected vehicle or pedestrian, and to detect a lane being traveled along and departure therefrom. Another example of the external information source is a vehicle information and communication system (VICS) configured to provide traffic congestion information, parking guidance, weather information, lane regulation information, and the like by using, for example, radio waves or beacons. Another example of the external information source is an intelligent transport system (hereinafter abbreviated to "ITS") capable of evaluating a relationship between an own vehicle and another vehicle or traffic infrastructure based on communication therewith.

Further, a data server 192 may also function as an external information source, and be configured to provide traffic information, weather information, and other information, via a communication network, such as the Internet (not shown).

Each information acquisition unit 110 is configured to support known communication technologies, including serial communication, e.g., universal serial bus (USB), and network communication using a protocol, such as Transmission Control Protocol/Internet Protocol (TCP/IP) and Hypertext Transfer Protocol (HTTP). Each information acquisition unit 110 may be configured to allow serialized information to be input in consideration of a temporal timing from a file transmitted from a storage device (not shown). Further, at least one suitable information acquisition unit 110 may be selected from among a plurality of information acquisition units 110 based on the input information, input timing, and the like.

The situation estimation unit 120 is configured to identify one or more tasks based on the input information and the task condition table 161. The load estimation unit 130 is configured to identify one or more sub-tasks based on each identified task and the sub-task table 162. Further, the load estimation unit 130 is also configured to acquire a load demand amount based on the identified sub-tasks, the sub-task demand amount table 163, and the like. The capacity level estimation unit 140 is configured to acquire a capacity level based on the acquired load demand amount. The presentation information selection unit 150 is configured to select information to be presented based on the capacity level and the information presentation table 165. In this case, the information to be presented is obtained from one or more presentation information sources 194. In FIG. 1, presentation information sources 194a to 194c are illustrated. However, the number of presentation information sources 194 is not limited to this example.

Various information, such as presentation information, is output to the output unit 170. Information to be input to the information presentation device 100 is input to the input unit 180. In FIG. 1, an example is illustrated in which the output unit 170 and the input unit 180 are each arranged in the information presentation device 100. However, the present invention is not limited to this example, and the output unit 170 and the input unit 180 may each be arranged externally to the information presentation device 100. Further, there may be a plurality of output units 170 and a plurality of input units 180.

The presentation information sources are not particularly limited, as long as the presentation information sources are capable of presenting the presentation information to be presented to the worker. An example of the presentation information sources and the presentation information is a vehicle warning, such as a fuel level warning or a battery warning, to be presented from a predetermined system (e.g., electronic control unit (ECU), etc.) included in the vehicle. Another example is a warning or an alert, such as a forward person collision warning or a pedestrian collision warning, presented from an ADAS. Another example is traffic congestion information, parking guidance, weather information, lane regulation information, and the like presented from a VICS. Another example is a map display or a direction of travel presented from a navigation system. Further, the presentation information may be information to be used for infotainment. Such information to be used for infotainment may be, for example, information on an operation mode of a music player, an album name, a track name, and the like. Such infotainment information may be presented from the music player or from another system mounted in the vehicle. Further, the presentation information may be, for example, a message presented from an E-mail or an arbitrary application. In addition, the above-mentioned presentation information may be acquired from the data server 192 via a communication network (not shown).

The presentation information sources 194 may be configured to function as the external information sources 191 for inputting input information. Conversely, the external information sources 191 may be configured to function as the presentation information sources 194 for presenting presentation information.

A computer 193 is connected to the information presentation device 100 directly, or via a communication network (not shown) and the data server 191, or via a communication network (not shown).

An example of the tables stored in the storage unit 160 is now described in detail. Each of the tables described below may be stored in advance in the storage unit 160, and may be created, updated, and the like at a desired timing.

FIGS. 2A and 2B are explanatory diagrams of an example of the task condition table. Each record in the task condition table 161 includes a task identification (ID) 201, a category 202, a task name 203, and one or more input conditions 204 (in the case of FIGS. 2A and 2B, input conditions 204a to 204c). The input conditions 204 each include an input item 211 (in the case of FIGS. 2A and 2B, input items 211a to 211c), and a condition 212 (in the case of FIGS. 2A and 2B, conditions 212a to 212c). The input item 211 indicates a type of information. The condition 212 defines a condition for the value of the input condition 211 of the same record.

The task condition table 161 is configured to define a condition for identifying a task. The term "task" as used herein refers to a situation that relates to at least one of the mobile body or the worker, may cause the worker to perform work, and, may place a mental load on the worker. In FIGS. 2A and 2B, as shown in category 202, an example is shown in which the tasks are classified into any one of a travel task, a location task, a surroundings task, a physical task, and a dynamic factor. Among those, the travel task, the location task, the surroundings task, and the physical task are applied in situations that relate to at least one of the mobile body or the worker, may cause the worker to perform work, and, may place a mental load on the worker.

As examples of the travel task, stopping, starting, accelerating, and the like when driving are defined. As examples of the location task, a location and a behavior at that location are defined, such as proceeding straight ahead at a cross-road intersection having traffic lights, turning right at a cross-road intersection, turning left at a cross-road intersection, and the like. As examples of the surroundings task, detection of a preceding vehicle, degree of proximity to a preceding vehicle, or similar relationships with a pedestrian are defined. As examples of the physical task, sun glare, night time, dim location, and the like are defined. Those tasks may be appropriately defined based on the work to be performed when the mobile body is moving. Further, the table may be expanded by classifying behavior elements with reference to the above-mentioned category classes as defined in International Standards Organization (ISO) standard ISO 10075.

In addition, in FIG. 2B, an example is shown in which, in addition to the above-mentioned tasks, a dynamic factor is further defined. The dynamic factor is a weighting to be applied in a situation that relates to at least one of the mobile body or the worker, and that, although by itself does not necessarily cause the worker to perform work, may place a mental load on the worker. In FIG. 2B, an example is shown in which the dynamic factor is defined based on speed and inter-vehicle distance. The dynamic factor may be defined by, for example, an intensity function "$f(v,x)$", in which a vehicle speed $v$ and an inter-vehicle distance $x$ are used as input variables. Thus, not only the mental load based on performing the work, but the mental load based on the situation, can also be taken into consideration by defining a dynamic factor.

The dynamic factor is not limited to the examples described above. For example, the dynamic factor may also be defined using discrete values, which represent the weather and the like, input as input information. In this case, a mapping table may be prepared in which a load intensity for a weather information input of "fine" is set to 1.0 as a reference, "cloudy" is set to 0.95, "rainy" is set to "1.1", and "snowy" is set to 1.2. The dynamic factor may then be acquired based on the input information that is actually input.

It is not absolutely necessary for the tasks to be classified into any one of the categories. Further, the category is not limited to the categories that are shown.

The input condition 204 defines the condition for determining, based on the input information, that the current situation is the task (situation) shown in the task name 203 of the same record. In FIGS. 2A and 2B, when the conditions of all the input conditions 204 of the same record are satisfied, namely, when the condition expressions of all the conditions 212 are satisfied, it is determined that the current situation is applicable to that task.

FIGS. 3A and 3B are explanatory diagrams of an example of the sub-task table. Each record in the sub-task table 162 includes a task ID 301, a category 302, a task name 303, and one or more sub-tasks 304 (in FIGS. 3A and 3B, sub-tasks 304a to 304e). The task ID 301, the category 302, and the task name 303 in the sub-task table 162 correspond to the respective fields in the above-mentioned task condition table 161.

The sub-task table 162 is configured to define a condition for identifying a sub-task. The term "sub-task" as used herein refers to a work element that, under the situation indicated by the task, has a possibility of being executed by the worker. In this case, one or more sub-tasks are defined for one task. Therefore, for example, for one task with a task name 303 such as "starting", a plurality of sub-tasks 304, such as "P_CHK_F (pedestrian check (forward))" and "V_CHK_F (vehicle check (forward))", may be defined.

A sub-task is, for example, work such as checking work, decision work, an operation, and the like, performed by the worker when actually driving the vehicle. Those sub-tasks may be defined based on, for example in the case of driving a vehicle, the road rules or road manners, or a checking operation typically performed by the worker based on experience.

FIGS. 4A and 4B are explanatory diagrams of an example of the sub-task demand amount table. Each record in the sub-task demand amount table 163 includes a sub-task ID 401, a category 402, a sub-task name 403, a load demand amount 404, and a coefficient 405. The sub-task ID 401, the category 402, and the sub-task name 403 in the sub-task demand amount table 163 each correspond to the respective fields in the sub-task table 162. The load demand amount 404 indicates a mental load on the worker during the work defined by the sub-task. The coefficient 405 is defined as a weighting for the sub-task. The coefficient 405 may be defined based on, for example, an actual work time of the sub-task or a work count of the sub-task.

The load demand amount 404 is capable of indicating the demand amount for each of one or more demand attributes. A demand attribute indicates the type of work placing a mental load on the worker. In FIGS. 4A and 4B, an example including, as demand attributes, a visual demand 404a, an auditory demand 404b, a recognition/decision demand 404c, a mental operation demand 404d, and the like, is shown. Those examples may use a definition of the demand amount as defined by previous studies, and define the intensity for each demand attribute of each sub-task. However, the demand attributes are not limited to the examples mentioned above. As other demand attributes, for example, a discomfort level, time pressure, a dissatisfaction level, and the like, may also be defined.

Figure 5:
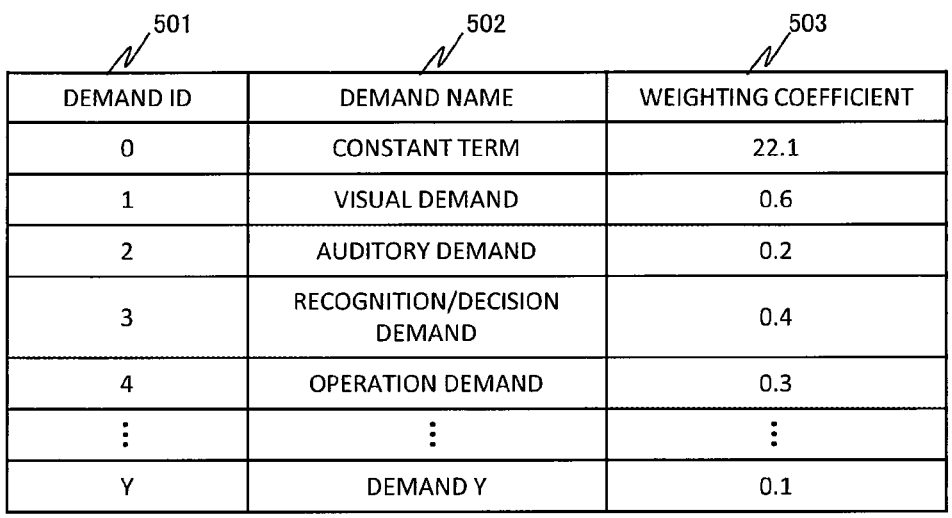
FIG. 5 is an explanatory diagram of an example of a load weighting table.

FIG. 5 is an explanatory diagram of an example of the load weighting table. Each record in the load weighting table 164 includes a demand ID 501, a demand name 502, and a weighting coefficient 503. The demand names 502 correspond to respective demand attributes included in the load demand amount 404 of the sub-task demand amount table 163. The weighting coefficient 503 is defined as a weighting for each demand attribute and the like.

FIGS. 6A and 6B are explanatory diagrams of an example of the information presentation table. Each record in the information presentation table 165 includes an item number 601, an information source name 602, an information type 603, a presentation demand amount 604, and a presentation time 605. The information source name 602 and the information type 603 indicate the presentation information presented from a presentation information source 194. The presentation demand amount 604 indicates a condition for determining whether or not the presentation information is to be presented. In this case, the presentation demand amount 604 indicates a required capacity level of the worker in order for the presentation information to be presented. The capacity level is described later. The presentation time 605 indicates a duration that the presentation information is to be presented for.

Figure 7:
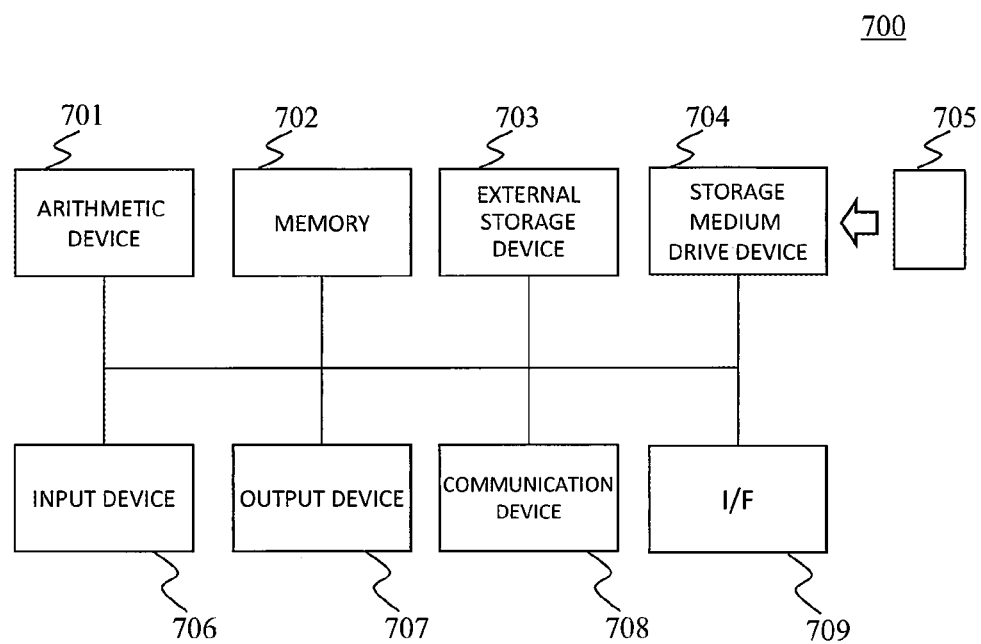
FIG. 7 is a hardware configuration example of each of the information presentation device, a data server, and a computer.

FIG. 7 is a hardware configuration example of each of an information presentation device, a data server, and a computer. A computer 700 (information presentation device 100, data server 192, and computer 193) includes an arithmetic device 701, a memory 702, an external storage device 703, a storage medium drive device 704, an input device 706, an output device 707, a communication device 708, an interface (I/F) 709, and the like.

The arithmetic device 701 is, for example, a central processing unit (CPU). The memory 702 is a volatile memory or a non-volatile memory. The external storage device 703 is, for example, a hard disk drive (HDD), a solid-state drive (SSD), and the like. The storage medium drive device 704 is capable of reading and writing information from and to a storage medium 705, such as a compact disk (CD), a digital versatile disk (DVD), or some other arbitrary portable storage medium. The input device 706 is a touch panel, a keyboard, a numeric keypad, a mouse, a microphone, and the like. The output device 707 is, for example, a display such as a liquid crystal monitor, a head-up display, an image projector, and a character output device, a device such as an amplifier, a speaker, and a headphone for presenting auditory information, such as speech, music, acoustic icons, and the like, a haptic display device that employs pressure, temperature, and the like, or an olfactory device configured to output a chemical substance that produces a smell. The input device 706 and the output device 707 may also be realized as a single device, such as by a touch panel. The communication device 708 is, for example, a network interface card (NIC) for connecting to a communication network (not shown). The I/F 709 is an interface for connecting to an external device.

The situation estimation unit 120, the load estimation unit 130, the capacity level estimation unit 140, and the presentation information selection unit 150 may each be realized by loading a predetermined program into the memory 702 and executing the loaded program by the arithmetic device 701.

The predetermined program may also be executed by downloading the program to the external storage device 703 from the storage medium 705 via the storage medium drive device 704, or, from a communication network (not shown) via the communication device 708, loading the downloaded program to the memory 702, and executing the program by the arithmetic device 701. Further, the predetermined program may be executed by directly loading the predetermined program to the memory 702 from the storage medium 705 via the storage medium drive device 704, or, from the communication network via the communication device 708, and executing the downloaded program by the arithmetic device 701.

A part or all of the situation estimation unit 120, the load estimation unit 130, the capacity level estimation unit 140, and the presentation information selection unit 150 may be realized as hardware by a circuit and the like.

The storage unit 160 may be realized by a part or all of the memory 702, the external storage device 703, the storage medium drive device 704, the storage medium 705, and the like. Further, the storage unit 160 may also be realized by the arithmetic device 701 controlling a part or all of the memory 702, the external storage device 703, the storage medium drive device 704, the storage medium 705, and the like, by executing the above-mentioned program.

The output unit 170 may be realized by the output device 707. The input unit 180 may be realized by at least one of the input device 706 or the I/F 709. Further, the input unit 180 may also be realized by an input device and the like connected via a communication network (not shown) and the communication device 708. In addition, the input unit 180 may be realized by a function, which is realized by loading the predetermined program to the memory 702 and executing the loaded program by the arithmetic device 701, controlling the I/F 709 or the communication device 708. The information acquisition unit 110 may be realized by the I/F 709 or the communication device 708, or by a function, which is realized by loading the predetermined program to the memory 702 and executing the loaded program by the arithmetic device 701, controlling the I/F 709 or the communication device 708.

The external information sources 191, the presentation information sources 194, and the data server 192 may each be connected to the information presentation device 100 via at least one of the communication device 708 or the I/F 709.

Further, each unit in the information presentation device 100 may be realized by a single device, or realized by distributing across a plurality of devices.

[Processing Description]

Figure 8:
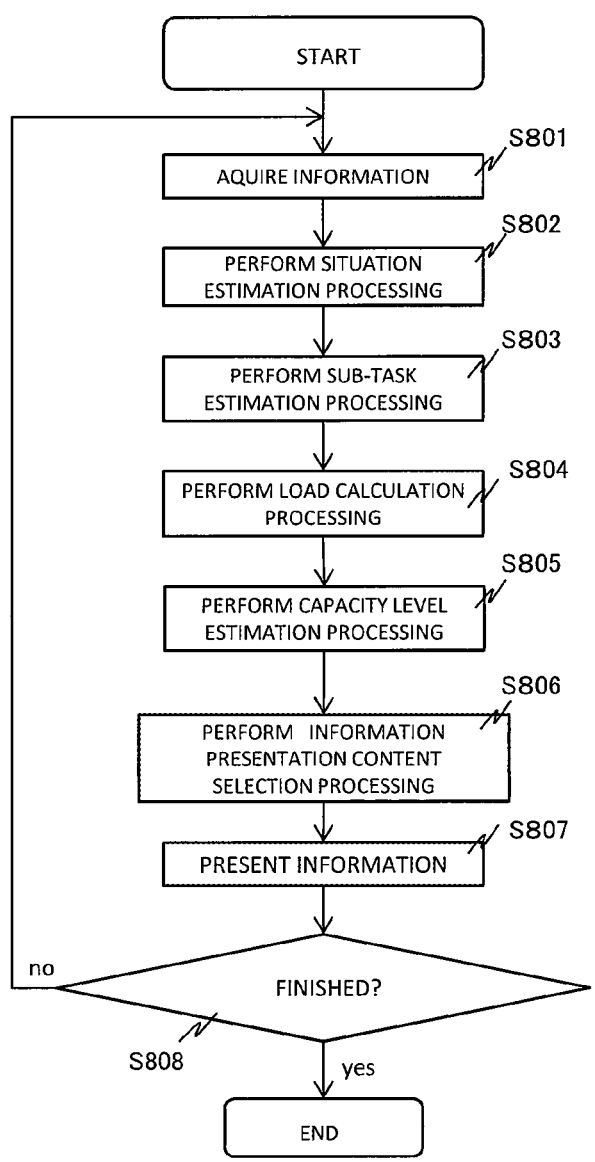
FIG. 8 is an example of a processing flowchart of the information presentation device.

FIG. 8 is an example of a processing flowchart of the information presentation device. This operation is executed every predetermined time interval (e.g., every 0.5 [sec]). Further, the flowchart is described based on an example in which a presentation demand for presentation information to the worker is input from the one or more presentation information sources 194 to the presentation information selection unit 150 in the information presentation device 100.

First, each information acquisition unit 110 acquires input information from each external information source 191 (S801). The input information acquired in this step is transmitted to the situation estimation unit 120. At the situation estimation unit 120, situation estimation processing for acquiring an established task group, which is a group of one or more tasks based on the input conditions, is performed using the task condition table 161 (S802). The situation estimation processing is described in more detail later. The situation estimation unit 120 is configured to transmit the acquired established task group to the load estimation unit 130.

FIG. 9 is an example of input information. In the example of input information 900, the fact that a vehicle speed of 42 [km/h], a steering wheel angle of 2 [degrees], an acceleration amount of 0 [%], a brake state of OFF, and the like, have been input from the external information source 191a as vehicle information from a CAN is shown. Further, the fact that "general road" for the road class, "cross-road intersection having traffic lights" for a point shape, "right" for the direction of travel, and the like have been input from the external information source 191b as information from a car navigation system is shown. In addition, the fact that "ON" for preceding vehicle detection, 1.8 [sec] for the inter-vehicle distance, and "OFF" for the preceding vehicle collision warning have been input from the external information source 191c as ADAS information is shown.

When two of more pieces of input information are input from the external information sources 191, and two or more information acquisition units 110 acquire respective pieces of input information, any one of the two or more information acquisition units 110 may transmit the two of more pieces of input information as a single bundle of information to the situation estimation unit 120, as shown by the input information 900 as an example.

Figure 10:
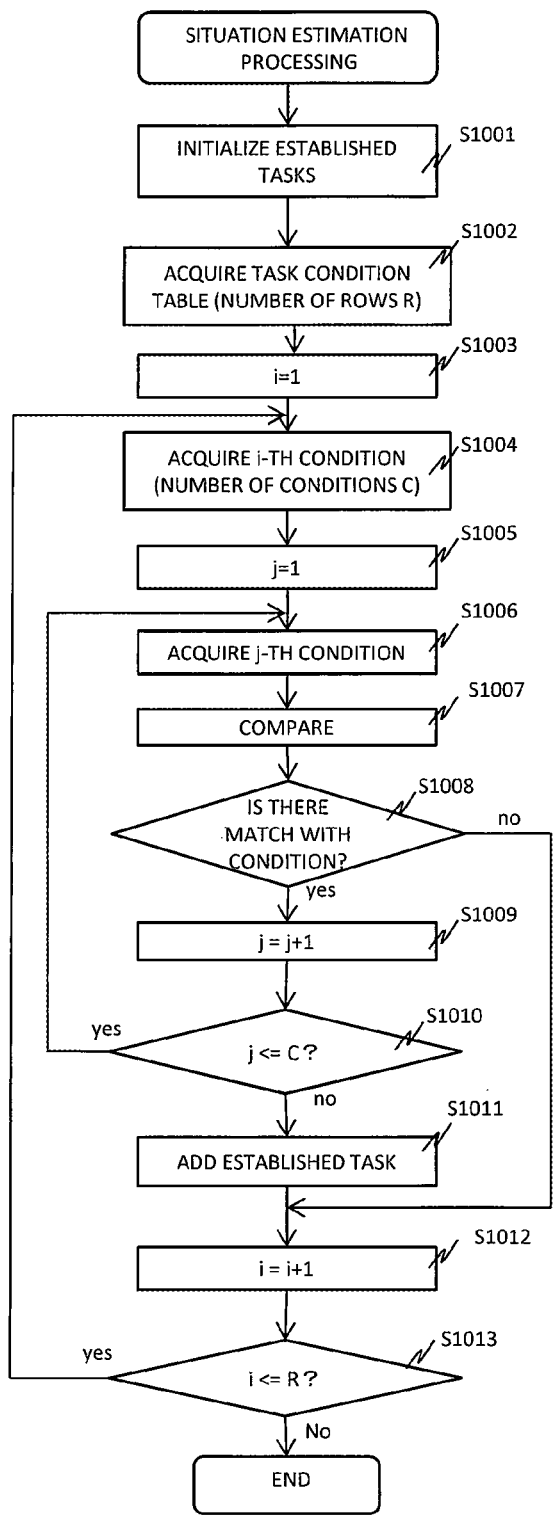
FIG. 10 is an example of a flowchart of situation estimation processing (S802).

FIG. 10 is an example of a flowchart of the situation estimation processing (S802). First, the situation estimation unit 120 initializes the established tasks (S1001), acquires the task condition table 161, and sets the number of records in the task condition table 161 to be the value of a variable R (S1002). Next, the situation estimation unit 120 initializes a counter i to 1 (S1003). Then, the situation estimation unit 120 acquires an i-th record of the task condition table 161, and sets the number of input conditions included in the record (number of input conditions 204) to be the value of a variable C (S1004). The situation estimation unit 120 initializes a counter j (S1005), and acquires a j-th input condition (S1006). The situation estimation unit 120 compares the acquired j-th input condition and the value of the applicable item among the input information acquired in Step S801 (S1007), and determines whether or not the input information satisfies the j-th input condition (S1008). The j-th input condition is, for example, in the case shown in FIGS. 2A and 2B, the input condition 204a when j=1, and the input condition 204b when j=2.

When it is determined in Step S1008 that the input condition is not satisfied (S1008: no), the processing advances to Step S1012, which is described later. On the other hand, when it is determined in Step S1008 that the input condition is satisfied (S1008: yes), the situation estimation unit 120 increases j to j=j+1 (S1009), and then determines whether or not j≤C, namely, whether or not the above-mentioned determination has been performed on all the input conditions of the i-th record (S1010). When it is determined in Step S1010 that j≤C, namely, that the above-mentioned determination has not been performed on all the input conditions (S1010: yes), the situation estimation unit 120 returns the processing to Step S1006. When it is determined in Step S1010 that j≤C is not true, namely, that the above-mentioned determination has been performed on all the input conditions (S1010: no), the situation estimation unit 120 determines that all the input conditions of the i-th record are established, and hence the task is established, and adds the task indicated by that record to the established task group (S1011).

After the determination of Step S1008 or the processing of Step S1011, the situation estimation unit 120 increases i to i=i+1 (S1012), and then determines whether or not i≤R, namely, whether or not the above-mentioned processing has been performed on all the records in the task condition table 161 (S1013). When it is determined in Step S1013 that i≤R, namely, that the above-mentioned processing has not been performed on all the records (S1013: yes), the situation estimation unit 120 returns the processing to Step S1004. When it is determined in Step S1013 that i≤R is not true, namely, that the above-mentioned processing has been performed on all the records (S1013: no), the situation estimation unit 120 finishes the situation estimation processing, and advances the processing to Step S803, which is described later.

FIG. 11 is an example of an established task group obtained as a result of the situation estimation processing. In this example, the tasks included in the established task group are indicated by the task name 203 in the task condition table 161, but those tasks may also be indicated by the task ID 201.

An established task group 1100 indicates that the tasks of deceleration, steady travel, right turn at cross-road intersection having traffic lights, and distance to preceding vehicle (medium) are established. In other words, the established task group 1100 indicates that a situation has been detected in which the inter-vehicle distance to the preceding vehicle is being set to a medium level while decelerating from steady travel in order to turn right at a cross-road intersection having traffic lights.

Thus, in this embodiment, one or more tasks may be simultaneously established in input information for the same, or almost the same, time. As a result, the vast number of situations that may actually occur can be described by using combinations of a limited number of tasks.

Returning to FIG. 8, after the processing of Step S802, the load estimation unit 130 performs sub-task estimation processing for acquiring an established sub-task group by using the sub-task table 162 to divide each task in the established task group into sub-tasks (S803). Next, the load estimation unit 130 uses the sub-task table 162, the sub-task demand amount table 163, and the load weighting table 164 to perform load calculation processing for calculating the load on the worker for the current situation (S804).

Figure 12:
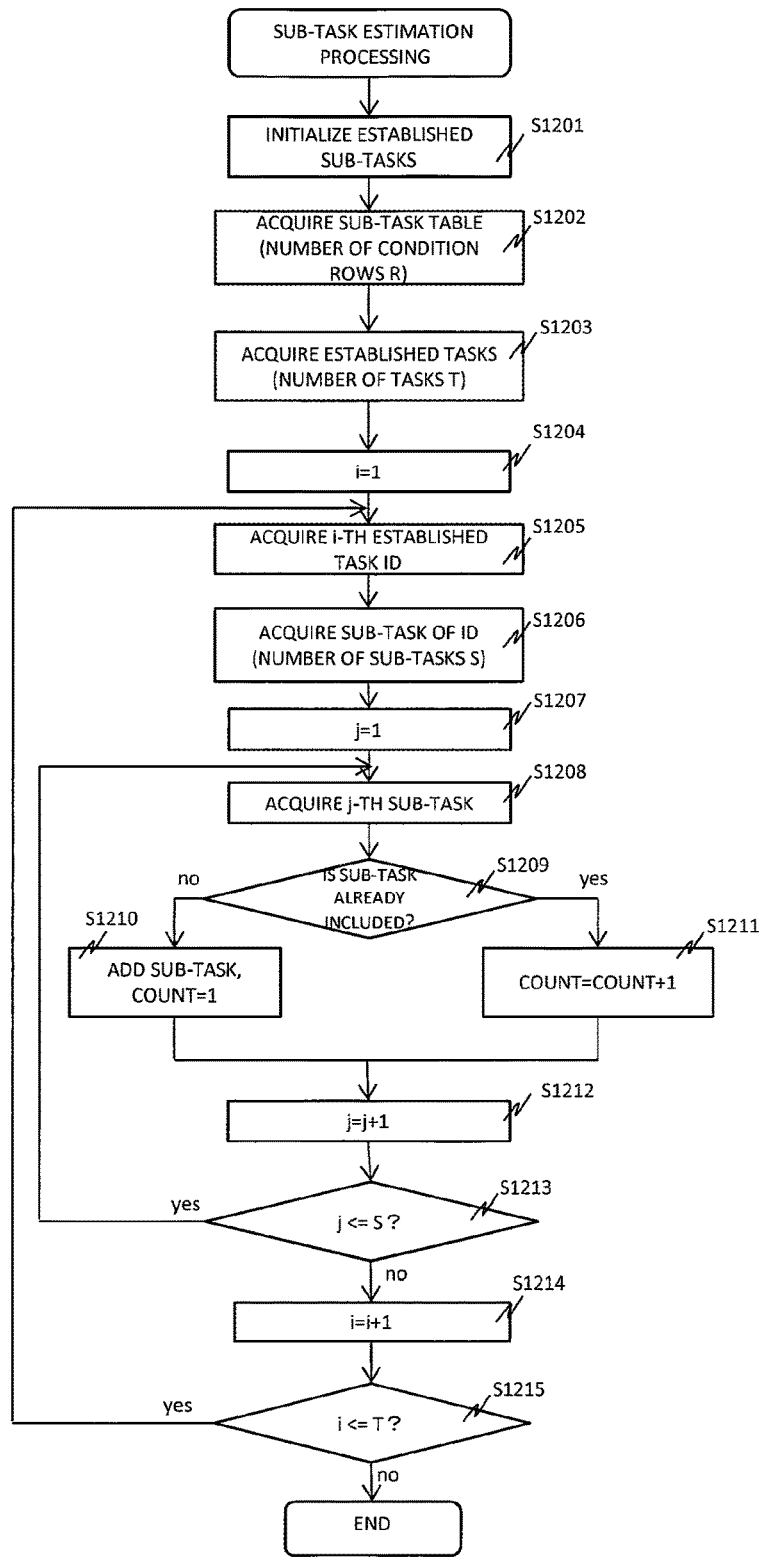
FIG. 12 is an example of a flowchart of the sub-task estimation processing (S803).

FIG. 12 is an example of a flowchart of the sub-task estimation processing (S803). First, the load estimation unit 130 initializes the established sub-task groups (S1201), and acquires the sub-task table 162 (S1202). The load estimation unit 130 acquires the established task group transmitted from the situation estimation unit 120, and sets the number of tasks included in the established task group to be the value of a variable T (S1203). Next, the load estimation unit 130 initializes a counter i to 1, namely, sets to i=1 (S1204). Then, the load estimation unit 130 acquires an i-th task from the established task group (S1205). The load estimation unit 130 acquires all the sub-tasks defined for the i-th task from the sub-task table 162, and sets the number of sub-tasks to be the value of a variable S (S1206). In order to perform this processing, the load estimation unit 130 identifies, from among the records in the sub-task table 162, one record including at least one of the task ID 301 or the task name 303 matching the i-th task, and acquires all the sub-tasks 304 of that record.

The load estimation unit 130 initializes the counter j to 1, namely, sets j=1 (S1207). Next, the load estimation unit 130 acquires a j-th sub-task from among the sub-tasks acquired in Step S1206 (S1208), and determines whether or not the same sub-task is included in the established sub-task group (S1209). When it is determined in Step S1209 that the same sub-task is not included in the established sub-task group (S1209: no), the load estimation unit 130 adds the j-th sub-task to the established sub-task group, and sets a count, which is the number of times that the sub-task has been established, to 1, namely, sets to count=1 (S1210). On the other hand, when it is determined in Step S1209 that the same sub-task is included in the established sub-task group (S1209: yes), the load estimation unit 130 increments the count of the j-th sub-task, namely, sets to count=count+1 (S1211).

After Step S1210 or S1211, the load estimation unit 130 sets to j=j+1 (S1212), and determines whether or not all the sub-tasks defined for the i-th task have been acquired, namely, whether or not j≤S (S1213). When it is determined in Step S1213 that j≤S, namely, that not all the sub-tasks have been acquired (S1213: yes), the load estimation unit 130 advances the processing to Step S1208. On the other hand, when it is determined in Step S1213 that j≤S is not true, namely, that all the sub-tasks have been acquired (S1213: no), the load estimation unit 130 sets to i=i+1 (S1214), and determines whether or not the above-mentioned processing has been performed on all the tasks, namely, whether or not i≤T (S1215). When it is determined in Step S1215 that i≤T, namely, that the above-mentioned processing has not been performed on all the tasks (S1215: yes), the load estimation unit 130 advances the processing to Step S1205. On the other hand, when it is determined in Step S1215 that i≤T is not true, namely, that the above-mentioned processing has been performed on all the tasks (S1215: no), the load estimation unit 130 finishes the sub-task estimation processing, and advances the processing to Step S804.

FIG. 13 is an example of an established sub-task group generated by the sub-task estimation processing. An established sub-task group 1300 includes, as shown in FIG. 13, a count indicating how many times each sub-task has been established. In this example, the sub-tasks included in the established sub-task group are indicated by the sub-task name 403 in the sub-task demand amount table 163, but those sub-tasks may also be indicated by the sub-task ID 401.

The established sub-task group 1300 indicates that sub-tasks such as, for example, "DCD_BRK (brake decision)", "CTL_BRK (brake operation)", and "P_SCN_F (pedestrian scan (front))", are established. In other words, in the current situation, the driver, who is the worker, needs to carry out those sub-tasks, and hence it may be considered that the mental load resulting from those sub-tasks is placed on the driver.

Thus, in this embodiment, one or more sub-tasks can be defined for one task. The sub-tasks may be defined as work to be performed by a person, e.g., a worker, who makes decisions in order to move a mobile body. Such work is finite, and is to some extent predictable. Therefore, the mental load for the vast number of situations that may actually occur can be calculated by using combinations of a limited number of sub-tasks.

Figure 14:
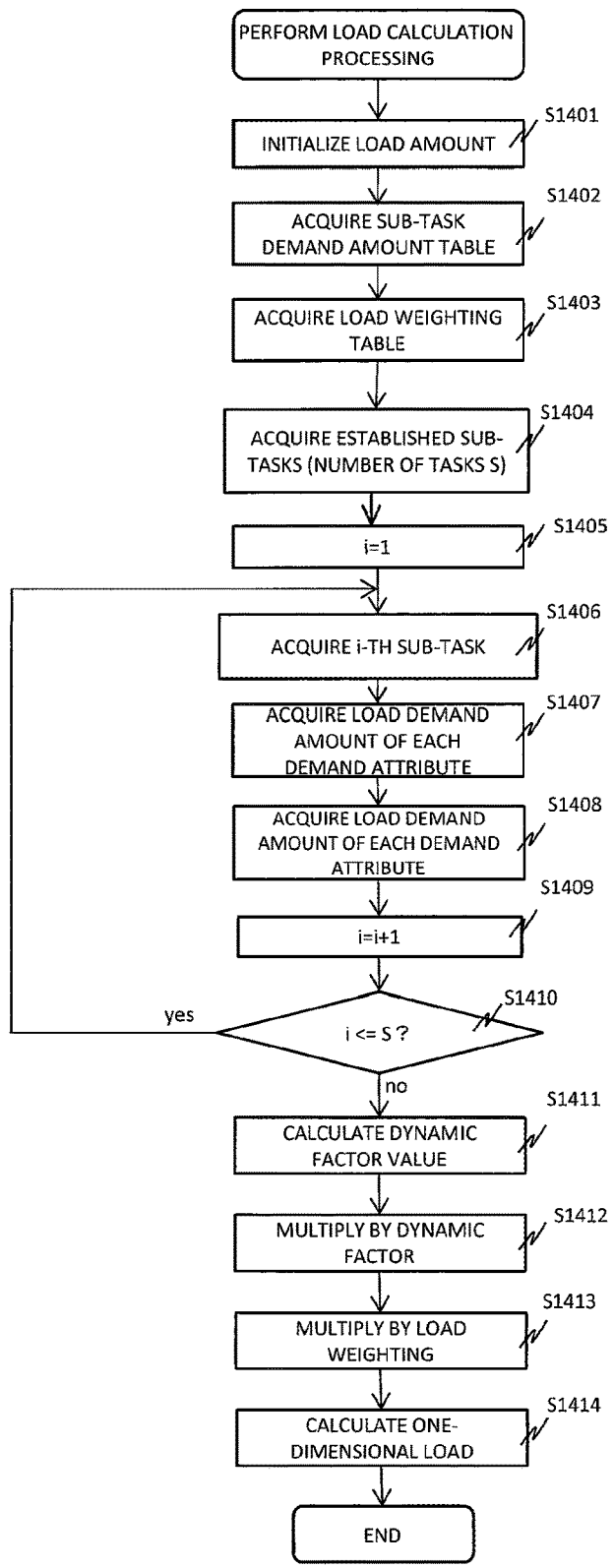
FIG. 14 is an example of a flowchart of a load calculation processing (S804).

FIG. 14 is an example of a flowchart of the load calculation processing (S804). First, the load estimation unit 130 initializes total values TV, TA, TC, and TP of respective load demand attributes, which are the load amounts to be used as outputs (S1401). The load estimation unit 130 then acquires the sub-task demand amount table 163 (S1402) and the load weighting table 164 (S1403). Next, the load estimation unit 130 acquires the established sub-task group, and sets the number of sub-tasks included in the established sub-task group to be the value of a variable S (S1404). Next, the load estimation unit 130 initializes a counter i to 1 (S1405). The load estimation unit 130 then acquires an i-th sub-task from the established sub-task group (S1406). The load estimation unit 130 acquires the load demand amount of each demand attribute from the sub-task demand amount table 163 (S1407), and adds the acquired load demand amounts to the total load demand amounts of respective demand attributes (S1408).

The processing of Steps S1407 and S1408 is now described. As the processing of Step S1407, the load estimation unit 130 identifies, among the records in the sub-task demand amount table 163, a record including at least one of the sub-task ID 401 or the sub-task name 403 matching the i-th sub-task, and acquires all the load demand amounts 404 (e.g., load demand amounts 404a to 404e shown in FIGS. 4A and 4B) of the identified record. Next, the load estimation unit 130 adds the acquired load demand amounts 404 to the total load demand amounts of respective demand attributes. In this case, the load estimation unit 130 represents the total load demand amount as a vector having Y-number of variables, the Y-number of variables being equal to the number of types of demand attributes. More specifically, for an i-th sub-task, for example, the load estimation unit 130 calculates the total values TV, TA, TC, and TP of respective load demand attributes by using the load demand amounts acquired in the processing of Step S1407 as vi, ai, ci, and pi for a visual demand V, an auditory demand A, a recognition/decision demand C, and a mental operation demand P, respectively, acquired from the sub-task demand amount table 163. In other words, in Step S1408, the load demand amounts acquired in the processing of Step S1407 are added to respective total values so that TV=TV+vi, TA=TA+ai, TC=TC+ci, and Tp=Tp+pi.

Next, the load estimation unit 130 increments the counter i to set to i=i+1 (S1409), and determines whether or not the above-mentioned processing has been performed on all the sub-tasks, namely, whether or not i≤S (S1410). When it is determined in Step S1410 that i≤S, namely, that the above-mentioned processing has not been performed on all the sub-tasks (S1410: yes), the load estimation unit 130 returns the processing to Step S1406. On the other hand, when it is determined in Step S1410 that i≤S is not true, namely, that the above-mentioned processing has been performed on all the sub-tasks (S1410: no), the load estimation unit 130 calculates a dynamic factor value (S1411), and multiplies the calculated dynamic factor by each of the load demand amounts calculated in Step S1408 (S1412).

In this case, the dynamic factor value of Step S1411 is a value indicating the mental load for the situation applicable to the task belonging to the "dynamic factor" of the category 202 in the task condition table 161. In order to calculate the dynamic factor value, the load estimation unit 130, or another unit in the information presentation device 100, is configured to determine whether or not the current situation is applicable to any one of the dynamic factors based on the input information, and when the current situation is applicable to any one of the dynamic factors, to acquire a function and constant defined for each task belonging to that dynamic factor from tables and the like, and calculate the dynamic factor value by using the acquired functions and constants. More specifically, for example, the load estimation unit 130 may determine, based on the input condition 204 in the task condition table 161 of FIG. 2B and the input information, whether or not the current situation is applicable to the dynamic factor "speed-inter-vehicle distance" of the task name 203, and when the current situation is applicable to that dynamic factor, calculate the dynamic factor value based on the function f(v,x) in which the speed and the inter-vehicle distance are used as variables.

Lastly, the load estimation unit 130 acquires the coefficient of each demand attribute from the load weighting table 164, multiplies the acquired coefficients by the load demand amounts of respective demand attributes (S1413), and adds a constant term acquired from the load weighting table 164 to all of those totals to obtain a one-dimensional load amount (S1414). In this case, the coefficient of each demand attribute acquired from the load weighting table 164 is, for example, "0.6", "0.2", etc., which are the values of the weighting coefficient 503 corresponding to, respectively, the "visual demand", the "auditory demand", and the like of the demand name 502 shown as an example in FIG. 5. Further, the constant term acquired from the load weighting table 164 is "22.1", etc., which is the value of the weighting coefficient 503 corresponding to the "constant term" of the demand name 502 shown as an example in FIG. 5. Specifically, for example, when the coefficients of the visual demand V, the auditory demand A, the recognition/decision demand C, and the mental operation demand P acquired from the load weighting table 164 are respectively wv, wA, wC, and wP, and the constant term acquired from the load weighting table 164 is wδ, the load estimation unit 130 calculates a one-dimensional load amount L as follows.

$$L=wvTV+wATA+wCTC+wPTP+w\delta$$

TV, TA, TC, and TP are the total values of respective demand load required attributes calculated in the processing of Step S1408 performed until Step S1414. Further, this expression does not contain a dynamic factor. However, the dynamic factor value calculated as the function f(v,x) by using the above-mentioned speed and inter-vehicle distance as variables may be multiplied by the overall total. Further, a dynamic factor calculated as a value for each load demand attribute may be individually multiplied by each item.

In this case, the number of times a sub-task has been established (e.g., the count of the established sub-task group 1300 shown in FIG. 13) may or may not be used in the calculation of the one-dimensional load amount. For example, in a case in which a plurality of tasks including "approach preceding vehicle (close)" are established, when a sub-task "CTL_BRK (brake operation)" has been established two or more times, the mental load placed on the worker is not necessarily equivalent to performing the brake operation two or more times, but the mental load may be the same as that when the brake operation is performed once. In such a case, it is not required to use the number of times the sub-task has been established in the calculation of the one-dimensional load amount. Further, for example, in a case in which tasks including the tasks "sun glare" and "person detection" are established, when the sub-task "P_SCN_F (pedestrian scan (front))" has been established two or more times, the mental load placed on the worker may be equivalent to scanning two or more times for pedestrians, namely, scanning for pedestrians in a "sun glare" situation and scanning for pedestrians in a "person detection" situation. In such a case, the number of times the sub-task has been established may be used in the calculation of the one-dimensional load amount. Whether or not the count is to be used in the calculation of the one-dimensional load amount may be determined based on at least one of at least a part of the tasks included in the established task group or at least a part of the sub-tasks included in the established sub-task group. When the count is to be used in the calculation of the one-dimensional load amount, for example, the count may be multiplied by each of the values of all the demand attributes.

An example of the load calculation processing has been described above. The load amount, and the one-dimensional load amount, calculated by the above-mentioned processing may be stored for a predetermined period, and a value obtained by smoothing based on the related art, such as moving average, may be used as the final output value. Further, a discrete value obtained by performing threshold processing and breaking down into levels having a plurality of steps, may also be used as the output value.

Returning to FIG. 8, after the processing of Step S804, the capacity level estimation unit 140 performs capacity level estimation processing (S805). In order to perform this processing, the capacity level estimation unit 140 sets an amount obtained by subtracting the load amount calculated by the load estimation unit 130 from a load limit amount as the capacity level.

The load limit amount is the maximum value of the mental load placed on the worker. The load limit amount may be, but is not limited to, a theoretical maximum value of the above-mentioned load demand amount, a value obtained by actually measuring the load demand amount when performing a specific work having a high load, or, an estimated value of the calculated load demand amount at that stage. In this case, an example is described in which the load limit amount is set in advance. However, the present invention is not limited to this. The load limit amount may be varied based on the established tasks and sub-tasks.

The capacity level estimation unit 140 calculates as the capacity level a difference between the load limit amount and the load demand amount calculated in the above-mentioned processing, and transmits the calculated capacity level to the presentation information selection unit 150.

For ease of description, an example is now described for a case in which the load demand amount is set within a range of 0 to 100, and the load limit amount is set to 100, namely, the maximum value of that range. In this case, when the load demand amount calculated by the above-mentioned processing is 70, the capacity level is calculated to be 30 (100−70=30).

Next, the presentation information selection unit 150 performs information presentation content selection processing (S806). In order to perform this processing, the presentation information selection unit 150 determines whether or not the presentation information can be presented based on the information presentation table 165, the presentation demands from the respective presentation information sources 194, and the capacity level, and based on this determination, controls so that the information is presented. More specifically, the presentation information selection unit 150 is configured to refer to, when there is a presentation demand from at least one presentation information source 194, at least one from among the item number 601 to the information type 603 of each record in the information presentation table 165, identify the record indicating the same presentation information as the presentation information to be presented based on the input presentation demand, and acquire the presentation demand amount 604 of that record. The presentation information selection unit 150 compares the presentation demand amount 604 and the capacity level, and when the presentation demand amount 604 is smaller, allows the demanded information to be presented.

When there are a plurality of pieces of presentation information from the presentation information sources 194, the presentation information selection unit 150 may acquire the presentation demand amount 604 for each presentation demand in the same manner as described above, and select whether or not the presentation information can be presented by comparing the capacity level and the smallest presentation demand amount 604 among the acquired plurality of presentation demand amounts 604. In this case, the smallest presentation demand amount 604 is the information having the highest presentation urgency. Therefore, comparing the capacity level and the smallest presentation demand amount 604 allows the information to be presented by prioritizing information having a higher presentation urgency.

However, the present invention is not limited to this, and may be configured so that, for example, each of a plurality of pieces of presentation information can be presented without duplication based on a predetermined condition, such as the value of the capacity level or there being no duplication among the devices outputting each of the plurality of pieces of presentation information.

Next, the presentation information selection unit 150 presents the presentation information to be presented based on the presentation demand selected in Step S806 (S807). In order to perform this processing, the presentation information selection unit 150 outputs an instruction and the like to the presentation information source 194 that is to present the presentation information to be presented based on the presentation demand selected in Step S806. Based on this instruction, the presentation information source 194 outputs the presentation information.

Then, the information presentation device 100 determines whether or not to finish the processing (S808). This determination may be performed by determining to finish the processing when an information presentation finish instruction has been input, the power supply of the information presentation device 100 has been turned off, and the like. However, the present invention is not limited to this. When it is determined in Step S808 that the processing is not to be finished (S808: no), the processing returns to Step S801, and the processing flow is restarted after a predetermined period. When it is determined in Step S808 that the processing is to be finished, the processing flow is finished.

A case has been described above in which a presentation demand from any one of the presentation information sources 194 is input. However, it is not necessarily the case that presentation demands are constantly being input. When no presentation demands have been input from any of the presentation information sources 194, the processing of Steps S801 to S805 may be performed in the manner described above, the processing of Steps S806 and S807 may be skipped, and the processing may advance to Step S808.

An example of the presentation information output in Step S807 is now described. In the following, an example is described in which the presentation information is displayed on a screen of a display device, a display region, and the like, arranged in an instrument panel. However, the presentation of the presentation information is not limited to this. The output device outputting the presentation information may be freely selected.

Figure 15:
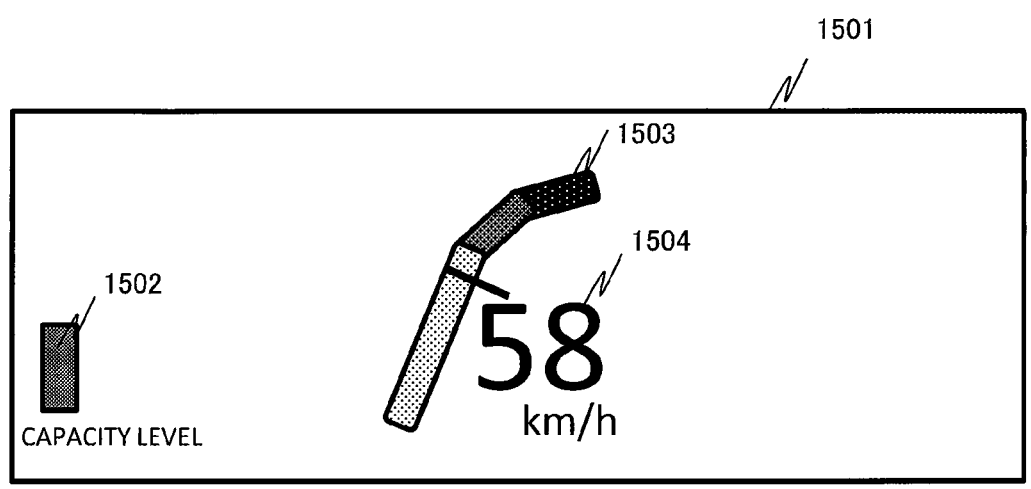
FIG. 15 is an example of a screen when no presentation demands have been input from any of presentation information sources.

FIG. 15 is an example of a screen when no presentation demands have been input from any of the presentation information sources 194. A screen 1501 includes a graph

1502, an engine speed 1503, and a speed 1504. The graph 1502 shows the capacity level calculated by the above-mentioned processing. The engine speed 1503 indicates the number of revolutions of the vehicle engine. The speed 1504 indicates the travel speed of the vehicle. The speed and engine speed may be input from any of the external information sources 191.

Figure 16:
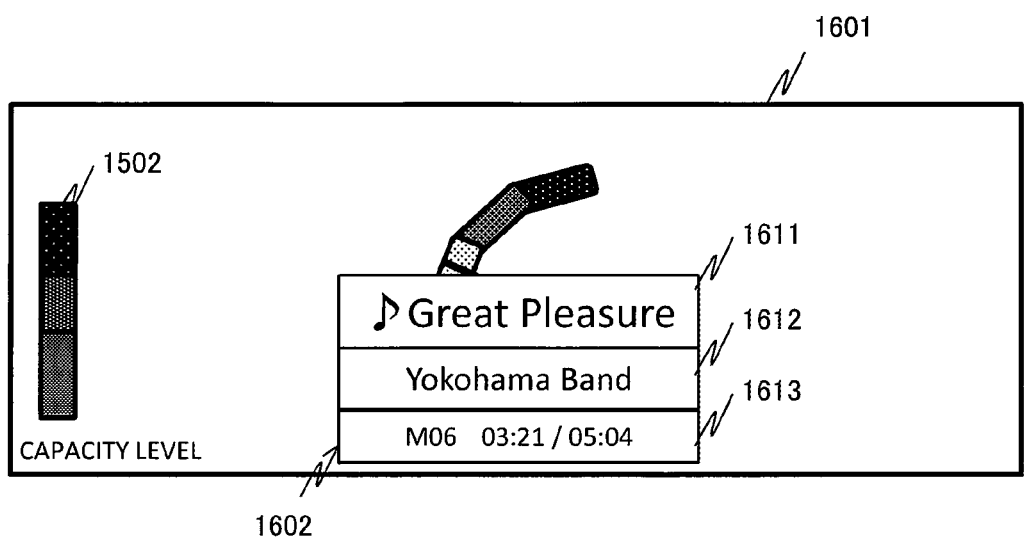
FIG. 16 is an example of a screen when a presentation demand has been input from a presentation information source that is a music player.

FIG. 16 is an example of a screen when a presentation demand has been input from a presentation information source 194 that is a music player. In FIG. 16, an example is illustrated of a case in which the presentation demand is input while the screen 1501 is being displayed, the capacity level calculated by the above-mentioned processing is about 80, the presentation demand amount calculated by the above-mentioned processing is 70, and the demanded presentation information is presented.

A screen 1601 includes music information 1602 in addition to the graph 1502, the engine speed 1503, and the speed 1504 (however, at least a part of the engine speed 1503 and the speed 1504 is not shown). The music information 1602 includes album name information 1611, artist name information 1612, and music information 1613 such as a track number and a playback position.

Figure 17:
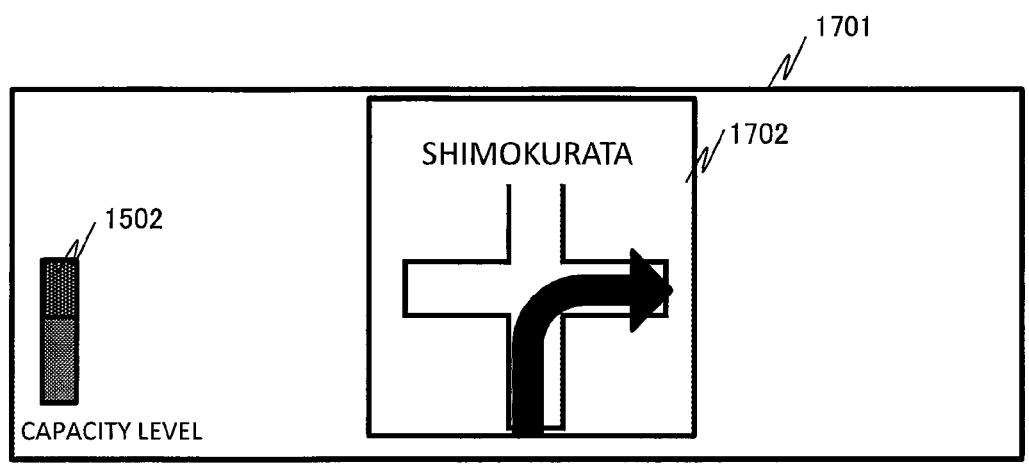
FIG. 17 is an example of a screen when a presentation demand has been input from a presentation information source that is a navigation system.

FIG. 17 is an example of a screen when a presentation demand has been input from the presentation information source 194 that is a navigation system. In FIG. 17, an example is illustrated of a case in which a presentation demand for an enlarged view of an intersection has been input, the capacity level calculated by the above-mentioned processing is about 60, the presentation demand amount calculated by the above-mentioned processing is 50, and the demanded presentation information is presented.

A screen 1701 includes an enlarged view of an intersection 1702 in addition to the graph 1502. Further, although not shown, the screen 1701 may also include the engine speed 1503 and the speed 1504 in addition to the graph 1502 and the enlarged view of an intersection 1702.

For example, in a state in which the capacity level is 60, when there is a presentation demand from the presentation information source 194 that is a music player at the same time as a presentation demand for an enlarged view of an intersection from the presentation information source 194 that is a navigation system, the information based on the presentation demand from the music player cannot be presented. The reasons for this are, first, because the capacity level is about 60 and the presentation demand amount of the presentation demand from the music player is 70, the capacity level is insufficient in order to present the information in accordance with the presentation demand from the music player. Second, the presentation demand amount for the presentation demand from the navigation system is 50, but the presentation demand amount for the presentation demand from the music player is 70, and hence the presentation demand from the navigation system has a higher presentation urgency.

Further, as another example, even when there has been a different presentation demand with a presentation demand amount of 55 at the same time as a presentation demand for an enlarged view of an intersection from the presentation information source 194 that is a navigation system, the information based on the another presentation demand cannot be presented. This is also because, even though the capacity level is about 60 and the presentation demand amount of the another presentation demand is 55, meaning that the capacity level is sufficient, the presentation demand amount for the presentation demand from the navigation system is 50, but the presentation demand amount for the another presentation demand is 55, and hence the presentation demand from the navigation system has a higher presentation urgency.

As described above, when a plurality of presentation demands that satisfy the condition for the capacity level simultaneously exist, information may be presented by selecting one of the presentation demand amounts, and then information may be presented by selecting another one of the presentation demand amounts. Specifically, for example, in the example described above, the information based on the another presentation demand may be presented after the presentation of the enlarged view of an intersection has finished. In order to enable this to be performed, the presentation information selection unit 150 may be configured to control so that the presentation demands are listed in order of increasing presentation demand amount, and when presentation of a given piece of information has finished, information is successively presented based on the list. The presentation information selection unit 150 may also be configured to control the presentation time of the presentation information based on, for example, the value defined by the presentation time 605 in the information presentation table 165.

Figure 18:
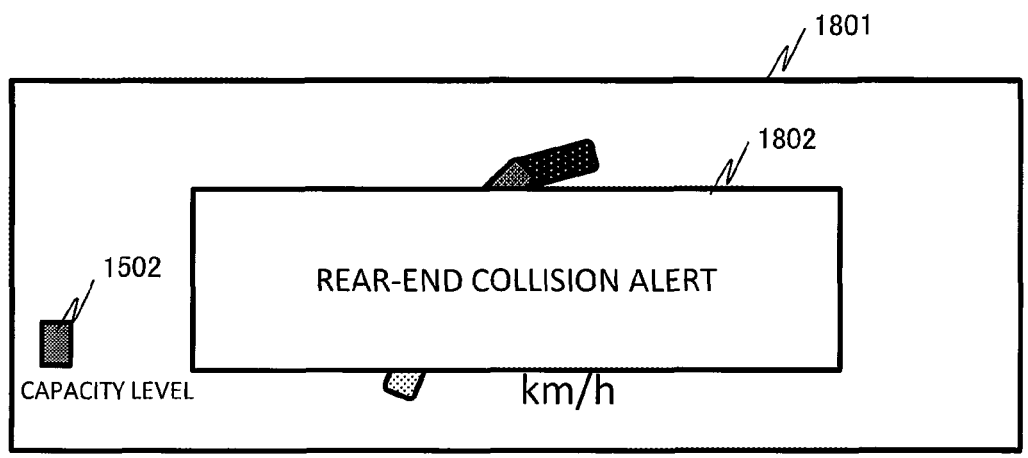
FIG. 18 is an example of a screen when a presentation demand has been input from a presentation information source that is an ADAS.

FIG. 18 is an example of a screen when a presentation demand has been input from the presentation information source 194 that is an ADAS. In FIG. 18, an example is illustrated of a case in which a presentation demand for a preceding vehicle collision warning has been input, the capacity level calculated by the above-mentioned processing is 10, the presentation demand amount calculated by the above-mentioned processing is 0, and the demanded presentation information is presented.

A screen 1801 includes a preceding vehicle collision warning 1802 in addition to the graph 1502. As described above, the capacity level is about 10, which is quite low, but the presentation demand amount for the preceding vehicle collision warning is 0, and hence the information is presented.

Thus, for information having a very high presentation urgency, setting the presentation demand amount to a very low value with respect to the range that the capacity level can be in enables the information having a very high presentation urgency to be presented regardless of the state of the capacity level. In this case, because the range of the capacity level is 0 to 100, setting the presentation demand amount to 0 or a negative value enables the information to be reliably presented. Further, setting in such a manner enables the presentation priority to be higher than for other information. This kind of presentation is particularly useful when used for information presentation of a warning system, e.g., a collision warning.

[Times Series Input Information]

The input information from the external information sources 191 may be acquired as values at a predetermined timing, but may also be acquired as time series information, including time information.

FIG. 19 is an example of input information acquired as time series information. Times series input information 1901 shows an example in which the input information is ON or OFF at a given time point. More specifically, when described using item numbers 1 and 2, the time series input information 1901 shows an example in which ON (or OFF) of a given information value continues for 30 units of time (e.g., milliseconds, etc.), and then OFF (or ON) continues for 52 units of time.

However, the input information to be input as time series information is not limited to the example shown in FIG. 19.

The input information may indicate, for example, a time and a value at that time. Further, the format is also not limited to the example shown in FIG. 19. In addition, the time series input information may be generated by each external information source 191, an external device (not shown), or the information acquisition units 110. When the time series input information is generated by the information acquisition units 110 or an external device, the information acquisition units 110 or an external device may be configured to store for a predetermined period the value of the input information acquired from the external information sources 191 at a predetermined timing, and bundle together the stored values of the input information at each timing for use as time series information.

The situation estimation unit 120, the load estimation unit 130, and the capacity level estimation unit 140 are each configured to perform the above-mentioned processing by using the input information at each time point. Therefore, the result calculated by the capacity level estimation unit 140 is a time series capacity level.

Figure 20:
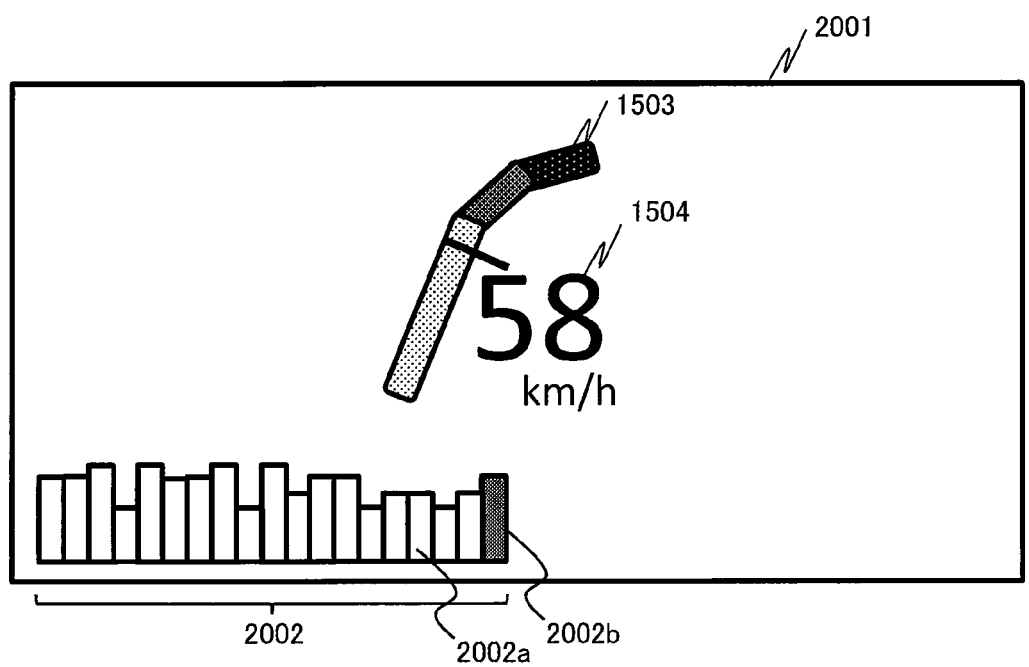
FIG. 20 is a screen example of a time series capacity level.

FIG. 20 is a screen example of a time series capacity level. A screen 2001 includes a graph 2002, the engine speed 1503, and the speed 1504. The graph 2002 shows the time series capacity level calculated by the above-mentioned processing. Among the plurality of bars forming the graph 2002, a display mode of a bar indicating a capacity level in the past (e.g., bar 2002a) may be different to the display mode of a bar indicating the current capacity level (e.g., bar 2002b). Methods of displaying a different display mode include, but are not limited to, changing the color, causing the bar to flash on and off, and the like. Displaying the graph 2002 in this manner makes it easier for the worker to recognize time series changes in the capacity level.

As described above, the time series capacity level may be calculated when the input information is in time series. However, even when the input information is not in time series, a time series capacity level can be obtained by storing the capacity level together with information on a time point when the capacity level is calculated.

[Application to Presentation Information of Capacity Level]

The content of the presentation information to be presented based on the presentation demand may be selected and output based on the time series capacity level. As a specific example, when the presentation information is route guidance information from a navigation system, the content of the presentation information may be built so that the route is retrieved based on a capacity level preference of the driver, who is the worker.

FIG. 21 is an example of a screen for setting a capacity level preference of the driver for the route to be provided as guidance. On a screen 2101, an example is shown in which, as the capacity level preference, one preference may be selected from among "normal", "low fatigue", "low stress", and "leisurely travel". In this case, an example is described in which any one of four preference types may beset. However, the present invention is not limited to this. Further, on the screen 2101, a predicted required time and a travel distance are further included for each preference type. However, information that is applicable to the route calculated by the navigation system and selected based on processing described later may also be displayed.

The "normal" mode is a mode in which the route is not set based on the capacity level. The "low fatigue" mode is a mode in which a route having a comparatively large capacity level compared with all other routes is retrieved. The "low stress" mode is a mode in which a route having a comparatively small value of a dip (steep decline) in capacity level is retrieved. The "leisurely travel" mode is a mode in which a route having a comparatively small number of dips in capacity level is retrieved.

Figure 22:
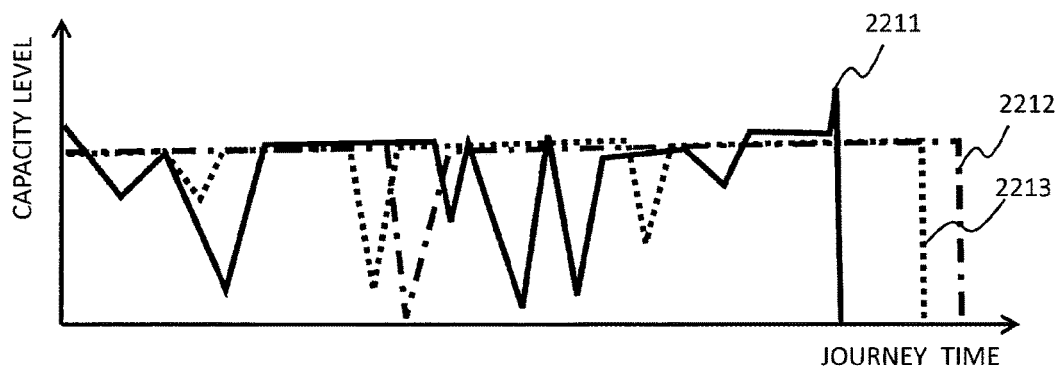
FIG. 22 is a graph for showing changes of the capacity level during movement.

The capacity level during movement is now described in more detail. FIG. 22 is a graph for showing changes of the capacity level during movement. In a graph 2201, the horizontal axis represents a journey time, and the vertical axis represents the capacity level. A line 2211 shows an example of changes in the capacity level for a route based on the above-mentioned "normal" mode, namely, for a route that is not set based on the capacity level. A line 2212 shows an example of changes in the capacity level for a route based on the above-mentioned "low fatigue" mode, namely, for a route having a comparatively large capacity level compared with all other routes. In this case, the line 2212 shows an example in which the changes in the capacity level are the same as for the above-mentioned "leisurely travel" mode, namely, changes in the capacity level for a route having a comparatively small number of dips in capacity level. A line 2113 shows an example of changes in the capacity level for a route based on the above-mentioned "low stress" mode, namely, for a route having a comparatively small value of dips in the capacity level.

In order to identify each route such as those shown in the graph 2201, the capacity level estimation unit 140 may be configured to calculate a capacity level for each of a plurality of route candidates acquired based on the related art, such as Dijkstra's algorithm, by the presentation information source 194, which is a navigation system. The capacity level estimation unit 140 may also be configured to calculate, for each route candidate, a capacity level by identifying a plurality of locations (e.g., various information on nodes, links, presence of traffic lights, etc.) that the vehicle is inferred to be at, determining whether or not each of those locations is applicable to any one of the tasks belonging to at least the "location task" of the category 202 in the task condition table 161, and when a location is applicable to any one of the tasks, identifying the sub-tasks based on the same processing as described above in order to calculate the capacity level. The locations that are identified in this case may be the location at which the vehicle is inferred to be at each predetermined time on the route candidate, or a predetermined type of location (e.g., an intersection, a junction, a point between an intersection and a junction, etc.) on the route candidate. Further, the journey time at those identified locations may be acquired based on known route search technology and the like.

The capacity level estimation unit 140 may also be configured to calculate the capacity level by taking into consideration, in the same manner as described above, whether or not a location of a road included in the route candidate is applicable to any one of the tasks belonging to the "physical task" of the category 202, or to the "dynamic factor" of the category 202.

Further, the capacity level estimation unit 140 may be configured to calculate the capacity level by taking into consideration, in the same manner as described above, whether or not an action by the driver belongs to the "travel task" of the category 202 based on past history or an action pattern generally inferred for the driver.

The capacity level estimation unit 140 may also be configured to set the route candidate having, among a plurality of route candidates, the largest integral value obtained by integrating the capacity level by the journey time as a route based on the "low fatigue" mode. The integral value obtained by integrating the capacity level by the journey time is the area defined by the line 2211, the horizontal axis, and the vertical axis.

The capacity level estimation unit 140 may also be configured to set, for example, when a dip in the capacity level has occurred, the route candidate having, among a plurality of route candidates, the highest minimum value (dip value) for the capacity level in the dip that has occurred as a route based on the "low stress" mode. A dip in the capacity level may be determined as having occurred when, for example, an amount of decrease in the capacity level within a predetermined time is equal to or more than a predetermined threshold (or more than the predetermined threshold), or when the capacity level itself is equal to or less than a predetermined threshold (or less than the predetermined threshold). The capacity level estimation unit 140 may be configured to select, when dips have occurred a plurality of times, any one of the routes based on at least one of the dip value or the number of dip occurrences.

The capacity level estimation unit 140 may also be configured to set, for example, when a dip in the capacity level has occurred, the route candidate having, among a plurality of route candidates, the fewest number of dips that have occurred as a route based on the "leisurely travel" mode. Whether or not a dip in the capacity level has occurred may be determined in the same manner as described above. The capacity level estimation unit 140 may be configured to select, when dips have occurred a plurality of times, any one of the routes based on at least one of the dip value or the number of dip occurrences.

The navigation system is configured to display and provide guidance based on the selected route. The display, guidance, and the like are the same as in the related art and the above-mentioned display, and hence a description thereof is omitted here. Such a configuration enables information to be presented that matches the preference and aptitude of the worker.

[Information Presentation Based on Capacity Level]

As described above, the presentation information selection unit 150 is configured to select the information to be presented based on the value of the capacity level. The presentation information selection unit 150 may select the information to be presented based on not only the value of the capacity level per se, but also on at least any one of the above-mentioned integral value obtained by integrating the capacity level by the journey time, the dip value, or the number of dips.

[Table Creation and Update]

As described above, the tables stored in the storage unit 160 may be created and updated (changed and deleted) at a desired timing. As described above, in this embodiment, because the tasks and sub-tasks are defined based on the mental load, maintenance and management can be performed flexibly. In this case, as an example, the creation and update of each of the task condition table 161, the sub-task table 162, and the sub-task demand amount table 163 are described. The creation and update of each of the tables may be performed by using the computer 193 and the like.

FIG. 23 is an example of a screen for creating and updating the task condition table 161. In FIG. 23, an example is shown for a case in which task-related information is changed. However, in addition to being changed, the task-related information may also be added to or deleted.

A screen 2301 includes a region 2311, a region 2321, and the like. The region 2311 is a region for specifying any one of addition, change, and deletion of the task-related information by the user using an input device. The region 2321 is a region for inputting the content of the addition, change, or deletion of the task-related information. As described above, in this case, because change is selected, the information on each record in the already existing task condition table 161 is displayed in the region 2321. The user uses the input device to select the item relating to the task he or she intends to change (e.g., category, task name, input condition (input item and condition), etc.). In FIG. 23, an example is shown in which the type of input condition is selected. After selecting in this manner the item he or she intends to change, the user inputs the value to be changed to. In this case, because the input item of the input condition has been selected, a list of the items that are selectable as the input item is controlled to be displayed. A region 2322 on the screen 2301 is an example in which a list of the items selectable as the input item are displayed. The user uses the input device to select any one of the input items from the region 2322. The computer 193 is configured to register the selected input item in the task condition table 161 as a new input item of the input condition for the selected task.

Further, for example, the value of the item to be changed may also be freely input. For example, when the condition of the input item has been selected as the item to be changed, the value of the item to be changed may be input in the region corresponding to the item selected from among a plurality of regions included in the region 2321, or in an input region that is displayed separately, for example. In addition, for example, when a category is to be newly added, the user may press a button 2331 by using the input device, and freely input in a predetermined region the name and the like of the category to be added. The computer 193 is configured to register the input information in the task condition table 161.

Figure 24:
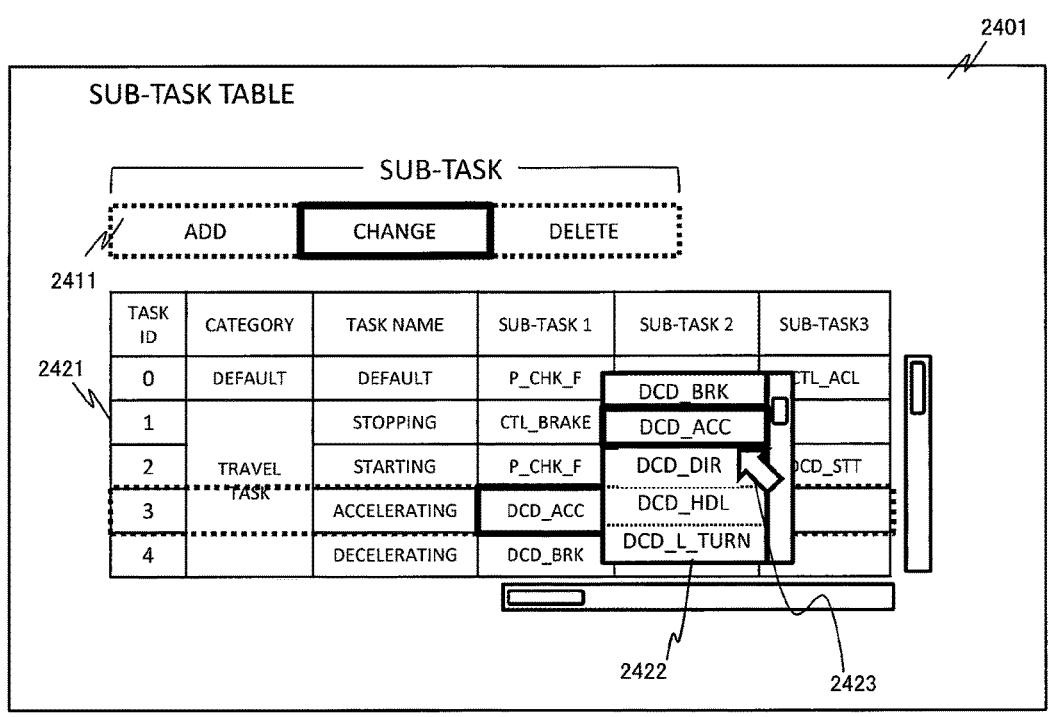
FIG. 24 is an example of a screen for creating and updating the sub-task table.

FIG. 24 is an example of a screen for creating and updating the sub-task table 162. In FIG. 24, an example is shown for a case in which sub-task-related information is changed. However, in addition to being changed, the sub-task-related information may also be added to or deleted.

A screen 2401 includes a region 2411, a region 2421, and the like. The region 2411 is a region for specifying anyone of addition, change, and deletion of the sub-task-related information by the user using an input device. The region 2421 is a region for inputting the content of the addition, change, or deletion of the sub-task-related information. As described above, in this case, because change is selected, the information on each record in the already existing sub-task table 162 is displayed in the region 2421. The user uses the input device to select the item relating to the sub-task he or she intends to change (e.g., category, task name, sub-task, etc.). In FIG. 24, an example is shown in which the item "sub-task" is selected. After selecting in this manner the item he or she intends to change, the user inputs the value to be changed to. In this case, an example is shown in which, because "sub-task" has been selected, a list of the sub-tasks that can be changed is controlled to be displayed. A region 2422 on the screen 2401 is an example in which a list of the sub-tasks that can be changed are displayed. The user uses the input device to select any one of the sub-tasks from the region 2422. The computer 193 is configured to register the selected sub-task in the sub-task table 162 as a sub-task applicable to the selected task.

Figure 25:
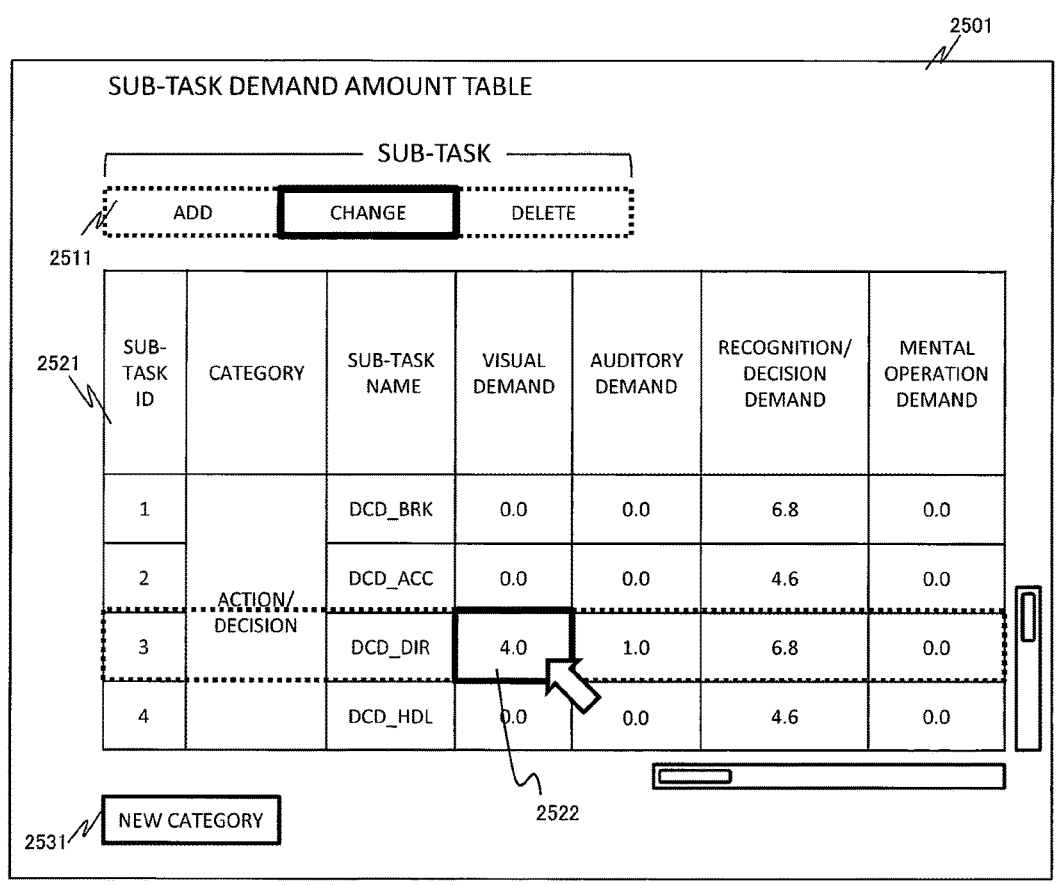
FIG. 25 is an example of a screen for creating and updating the sub-task demand amount table.

FIG. 25 is an example of a screen for creating and updating the sub-task demand amount table 163. In FIG. 25, an example is shown for a case in which information on the presentation demand amount of the sub-task is changed. However, in addition to being changed, the information may also be added to or deleted.

A screen 2501 includes a region 2511, a region 2521, and the like. The region 2511 is a region for specifying any one of addition, change, and deletion of the information on the presentation demand amount by the user using an input device. The region 2521 is a region for inputting the content of the addition, change, or deletion of the information on the load demand amount. As described above, in this case, because change is selected, the information on each record in the already existing sub-task demand amount table 163 is displayed in the region 2521. The user uses the input device to select the item on the load demand amount he or she intends to change (e.g., category, sub-task name, demand attribute, etc.). In FIG. 25, an example is shown in which the demand attribute of the "visual demand" is selected. After selecting in this manner the item he or she intends to change, the user inputs the value to be changed to. In this case, an example is shown in which, because a demand attribute is selected, the user can input the value of the demand attribute in a region 2522 by using the input device. The computer 193 is configured to register the input value in the sub-task demand amount table 163 as a load demand amount of the selected attribute demand.

Further, for example, when the user intends to newly add a category, the user may press the button 2531 by using the input device, and freely input the name and the like of the category to be added to a predetermined region. The computer 193 is configured to register the input information in the sub-task demand amount table 163.

Each of the tables that have been created and updated in the manner described above is input to the information presentation device 100 and stored in the storage unit 160 at an arbitrary timing via a communication network and an I/F, or by reading data stored in a portable storage medium.

[Load Weighting Table]

As described above, the load weighting table 164 is used for correction after the dynamic factor multiplication (S1412) has been performed in the load calculation processing (S804 in FIG. 8, FIG. 14) by the load estimation unit 130. The purpose of this processing is to scale the value of the load demand determined using a plurality of tasks, a plurality of sub-tasks, and a dynamic factor, which are described below, in order to approximate the mental load of the action felt by the worker in the real world.

In this case, the value of the WL actually felt by the worker is represented as L, and the WL value measured for a given work situation i is represented as Li. Further, the one-dimensional load amount (calculated mental load amount) for the given work situation i is represented as L'i. It is not necessary for the WL value Li and the one-dimensional load amount L'i to strictly match. The weighting value and the constant term for calculating the one-dimensional load amount L are set to approximate the WL value Li.

The one-dimensional load amount L'i is determined using the multiple regression model shown in Math. 1. In this case, four types of mental load demand attributes are described, namely, the visual demand V, the auditory demand A, the recognition/decision demand C, and the mental operation demand P. Further, the load demand amounts of the visual demand V, the auditory demand A, the recognition/decision demand C, and the mental operation demand P used after the dynamic factor multiplication (S1412), are respectively Vi, Ai, Ci, and Pi. In addition, the weighting values acquired from the load weighting table for the visual demand V, the auditory demand A, the recognition/decision demand C, and the mental operation demand P, are respectively wv, wA, wC, and wP, and the constant term is wδ.

$$L'_i = w_v V + w_a A + w_c C + w_p P + w_\delta \quad \text{[Math. 1]}$$

For this one-dimensional load amount L'i, the weighting values wv, wA, wC, and wP, and the constant term wδ, used to approximate the WL value Li actually felt by the worker may be determined by using, for example, a least squares method. As an example of such a method, a method is described below in which the WL value felt by the worker is measured for several work situations by using a NASA-Task Load Index (TLX) method, which is a method used in many technologies in order to measure WL based on subjective indices. In the NASA-TLX method, a WL value from 0 to 100 is calculated by asking the worker to provide a rating on six subscales, and to rate the importance between combinations of two subscales.

In this case, a square error E of the WL value Li of an i-th situation and the load demand amounts Vi, Ai, Ci, and Pi of the visual demand V, the auditory demand A, the recognition/decision demand C, and the mental operation demand P, respectively, is represented by Math. 2.

$$E = \sum_{i=1}^{N} \{L_i - (w_v V_i + w_a A_i + w_c C_i + w_p P_i + w_\delta)\}^2 \quad \text{[Math. 2]}$$

In order to minimize the square error E, the square error E is partially differentiated with respect to each of wδ and the weighting values wv, wA, wC, and wP to zero. As a result, the following expressions represented by Math. 3 to Math. 7 are obtained.

$$\frac{\partial E}{\partial w_v} = -2\sum_{i=1}^{N} V_i \{L_i - (w_v V_i + w_a A_i + w_c C_i + w_p P_i + w_\delta)\} = 0 \quad \text{[Math. 3]}$$

$$\frac{\partial E}{\partial w_a} = -2\sum_{i=1}^{N} A_i \{L_i - (w_v V_i + w_a A_i + w_c C_i + w_p P_i + w_\delta)\} = 0 \quad \text{[Math. 4]}$$

$$\frac{\partial E}{\partial w_c} = -2\sum_{i=1}^{N} C_i \{L_i - (w_v V_i + w_a A_i + w_c C_i + w_p P_i + w_\delta)\} = 0 \quad \text{[Math. 5]}$$

$$\frac{\partial E}{\partial w_p} = -2\sum_{i=1}^{N} P_i \{L_i - (w_v V_i + w_a A_i + w_c C_i + w_p P_i + w_\delta)\} = 0 \quad \text{[Math. 6]}$$

$$\frac{\partial E}{\partial w_\delta} = -2\sum_{i=1}^{N} \{L_i - (w_v V_i + w_a A_i + w_c C_i + w_p P_i + w_\delta)\} = 0 \quad \text{[Math. 7]}$$

Rearranging the expressions represented by Math. 3 to Math. 7 to obtain a determinant allows the weighting values wv, wA, wC, and wP, and wδ to be obtained, to be represented by Math. 8 by using an inverse matrix.

$$\begin{pmatrix} w_v \\ w_a \\ w_c \\ w_p \\ w_\delta \end{pmatrix} = \begin{pmatrix} \sum V_i^2 & \sum V_i A_i & \sum V_i C_i & \sum V_i P_i & \sum V_i \\ \sum V_i A_i & \sum A_i^2 & \sum A_i C_i & \sum A_i P_i & \sum A_i \\ \sum V_i C_i & \sum A_i C_i & \sum C_i^2 & \sum C_i P_i & \sum C_i \\ \sum V_i P_i & \sum A_i P_i & \sum C_i P_i & \sum P_i^2 & \sum P_i \\ \sum V_i & \sum A_i & \sum C_i & \sum P_i & N \end{pmatrix}^{-1} \quad \text{[Math. 8]}$$

$$\begin{pmatrix} \sum V_i L_i \\ \sum A_i L_i \\ \sum C_i L_i \\ \sum P_i L_i \\ \sum L_i \end{pmatrix}$$

ただし、 $\sum \equiv \sum_{i=1}^{N}$ in which

Thus, the weighting values wv, wA, wC, and wP, and wδ, which are the elements of the load weighting table 164, may be determined by observing under several situations the value Li of the WL actually felt by the worker and each of the load demand amounts Vi, Ai, Ci, and Pi obtained after the dynamic factor multiplication (S1412) performed by the load estimation unit at that time.

The demand attributes are not limited to the examples described above. Arbitrary attributes may be included as the demand attributes. Further, the number of demand attributes is not limited. Regardless of what type of attributes the demand attributes are, the load weighting of each demand attribute may be determined in the same manner as described above. Further, calculation of the load weighting is not limited to the above-mentioned least squares method. For example, the load weighting may be determined by another numerical analytical approach, such as anon-linear least squares method, a steepest descent method, or Newton's method. In addition, the multiple regression method in Math. 1 is an example. The dimension of the value of each demand attribute, the formula of the exponential function, and the like may be selected as appropriate. Further, the application of a probability model other than the analysis model described above, the use of statistical numerical values, and the like, are also not hindered.

The method of measuring the WL value felt by the worker is not limited to the above-mentioned NASA-TLX method. The WL value to be used may be selected from among many methods. For example, the WL value may be a value obtained based on subjective indices, such as by a Swift Worksite Assessment and Translation (SWAT) method and a Driving Activity Load Index (DALI) method, or a numerical value having a high correlation to a mental WL obtained by an occlusion method, or obtained by using a biomarker such as heart rate.

The WL value actually felt by the worker may also be calculated by measuring under a limited situation. In such a case, because the nature of such a situation is variable, accuracy can be expected to improve. Further, a larger number of measured situations is better. However, when the number of situations is too large, this can conversely result in a decrease in accuracy due to the effects of noise. In such a case, a plurality of load weightings obtained by, for automobile driving for example, calculating a separate load weighting based on the road class, such as a general road and a highway, may be prepared in advance and applied.

One embodiment according to the present invention has been described above. In the WL way of thinking, when the intensity of the work is strong, the worker needs to concentrate and work hard, and when such a state continues, the worker feels mental fatigue. When such a state continues for an extended period, this may lead to psychiatric disorders such as depression. On the other hand, when a low intensity work state continues for an extended period, this can lead to boredom, monotony, dissatisfaction, a lowered consciousness of the worker, and a decline in productivity. Further, when another work hampering the original work occurs, this can be a factor in accidents during the work due to a deterioration in concentration.

For example, for a worker performing the work of driving an automobile, automobile accidents caused by WL issues are a problem. Specifically, accidents can occur due to dosing off or diminished attentiveness caused by fatigue as a result of driving for an extended period or by a monotonous driving situation. Many accidents are caused by failing to detect, recognize, and avoid danger as a result of watching or listening to a large amount of information while driving by using an information device such as a smartphone or a car navigation system, or by operating the device. Actions by the worker such as watching, listening, using, or operating the information device in the car can be a factor in causing distractions that impair the functions of perception, judgment, and operation as resources of the worker.

Therefore, there is a need to improve the work environment by using the WL to observe and evaluate the intensity of the work performed by the worker and the situation of the worker in response to that work, as well as to consider a suitable selection and timing for information presentation, and design a creative work process. Even for automobile driving, there is a need for development of a new system that estimates the WL of the worker based on the human factors (errors in "perception", "judgment", and "operation") of an accident, and limits the behavior of the automobile itself when those human factors are at a high level, as well as limits the amount of information presented by an information device and the required operation amount.

Hitherto, as a method of evaluating WL, physiological indices for measuring the heart rate, brain waves, amylase level, and the like, of the worker by a sensor, subjective indices for evaluating a score obtained using a questionnaire, sub-issue indices for measuring the work results when a sub-issue is applied, and the like, have been used. Based on those indices, in particular relating to automobile driving work, there has been a technology for adjusting the selection and timing of the information to be presented to the worker by an in-vehicle device by using a WL evaluation result of the worker measured using those indices. However, the related art is based on the assumption that a WL designed for a specific situation in advance is output. However, in actual practice, there is an almost infinite number of situations. It is difficult, and impractical, to measure the WL of all of those situations.

As described above, in this embodiment, situation estimation, load estimation, and capacity level estimation are performed by using the task condition table, the sub-task table, the sub-task demand amount table, and the load weighting table. The load demand amount for all situations can be analyzed based on a combination of a finite number of tasks and a combination of a finite number of sub-tasks.

The load weighting table is corrected so as to approximate the WL felt by the worker. As a result, a practical work environment may be provided that, through selection of the information to be presented based on the capacity level, is highly comprehensive and is easily maintained and managed even for a very large number of situations.

In the above embodiment, the load demand amount is calculated by using the task condition table, the sub-task table, the sub-task demand amount table, and the load weighting table. However, it is not necessary to use all of those tables to calculate the load demand amount. The load demand amount may be calculated using any method, as long as the above-mentioned tasks and sub-tasks are identified from the input information, and a load demand amount indicating a mental load on the worker can be acquired from the sub-tasks. Similarly, in the above embodiment, the determination regarding whether or not the presentation information can be presented is performed by using the capacity level and the information presentation table. However, it is not necessarily required to use the information presentation table. The determination regarding whether or not the presentation information can be presented may be performed based on the capacity level.

Further, in the above embodiment, the capacity level is described as an amount obtained by subtracting a load amount calculated by the load estimation unit from a load limit amount. However, the capacity level may be any value that is acquired from the load demand amount. The technology for acquiring the capacity level is not limited to the example described above. For example, the capacity level may be acquired from the load demand amount and a predetermined function.

In addition, the above-mentioned tables are examples, and the present invention is not limited to the tables that are shown. For example, any table may be used, as long as the table shows each of the pieces of the information described above, such as the tasks, the sub-tasks, the load demand amount, the weighting coefficient, the constant term, the presentation demand amount, and the like. The configuration of the information presentation device is also an example, and the present invention is not limited to the information presentation device that is illustrated. For example, an information presentation device may be used in which a given unit includes at least a part of the functions of another unit. Further, one unit may be divided into a plurality of units. In addition, the information presentation device may be an independent single device, or may be configured as a part of another device (e.g., navigation system, etc.).

Although the embodiment of the present invention invented by the inventors has been specifically described above, the present invention is not limited to the above-mentioned embodiment. It should be understood that various modifications can be made within the scope of the gist of the present invention. For example, although the above-mentioned embodiment has been described in detail to facilitate understanding of the present invention, the present invention is not necessarily limited to a configuration in which all of the configurations described above are included. Further, a part of the configurations of a given embodiment of the present invention may be substituted with configurations from another embodiment. Still further, configurations from another embodiment may be added to the configurations of a given embodiment of the present invention. In addition, a part of the configurations of each embodiment of the present invention may be added to, deleted from, or substituted with other configurations.

Further, in the drawings, although the control lines and the information lines considered to be necessary for describing the present invention are illustrated, not all of the control lines and information lines that are in fact included are illustrated. It may be considered that in actual practice almost all configurations are interconnected.

REFERENCE SIGNS LIST

100: information presentation device, 110: information acquisition unit, 120: situation estimation unit, 130: load estimation unit, 140: capacity level estimation unit, 150: presentation information selection unit, 160: storage unit, 161: task condition table, 162: sub-task table, 163: sub-task demand amount table, 164: load weighting table, 165: information presentation table, 170: input unit, 180: output unit, 191: external information source, 192: data server, 193: computer, 194: information presentation source

The invention claimed is:

1. A system that improves safety of a vehicle, the system comprising:
   a display;
   an Advanced Driving Assistance System (ADAS) that measures surroundings of the vehicle using sensors;
   a memory that stores: task information indicating one or more tasks indicating a situation, sub-task information indicating, for each situation of a particular task, one or more sub-tasks, which are work elements, having a possibility of being executed, and sub-task demand amount information indicating a load demand amount, which is a mental load for each sub-task; and
   a processor that is communicatively coupled to the ADAS and the memory, wherein the processor:
   identifies one or more tasks based on measurements received from the ADAS,
   determines one or more sub-tasks based on each of the one or more tasks and the sub-task information,
   calculates a mental loading of an operator of the vehicle based on the one or more sub-tasks and the sub-task demand amount information;
   determines a capacity level based on the mental loading; and
   selectively displays information related to the one or more tasks on the display based on the capacity level.

2. The system according to claim 1, further comprising an input unit,
   wherein at least one of the task information, the sub-task information, or the sub-task demand amount information is input via the input unit and stored in the memory.

3. The system according to claim 1, wherein:
   the processor stores the measurements received from the ADAS over a plurality of time periods, and
   wherein the capacity level is determined based on the measurements received from the ADAS over the plurality of time periods.

4. The system according to claim 1, further comprising:
   a vehicle information and communication system (VICS) that is communicatively coupled to the processor, wherein the VICS provides at least one of traffic congestion information, parking guidance, weather information and lane regulation information;
   wherein the processor further determines the mental loading based on information provided by the VICS.

5. The system according to claim 1,
   wherein the memory further stores a weighting based on a situation that does not necessarily cause the operator of the vehicle to perform the task, but has a possibility of placing a mental load on the operator of the vehicle, and
   wherein the mental loading is further determined based on the weighting.

6. A method for improving safety of a vehicle, the method comprising:
   receiving, from sensors of an Advanced Driving Assistance System (ADAS), measurements of surroundings of the vehicle;

identifying one or more tasks that are stored in a memory based on the measurements of surroundings of the vehicle;

identifying one or more sub-tasks based on each of the one or more tasks and sub-task information indicating, for each situation of a task, one or more sub-tasks, which are work elements, having a possibility of being executed by an operator of the vehicle, calculating a mental loading of the operator of the vehicle based on the one or more sub-tasks;

determining a capacity level based on the mental loading; and selectively displaying information related to the one or more tasks based on the capacity level.

7. A non-transitory computer readable storage medium that stores instructions that when executed by a computer cause the computer to perform the method according to claim 6.

* * * * *